(12) United States Patent
Lakshman et al.

(10) Patent No.: US 10,460,509 B2
(45) Date of Patent: Oct. 29, 2019

(54) PARAMETERIZING 3D SCENES FOR VOLUMETRIC VIEWING

(71) Applicant: Dolby Laboratories Licensing Corporation, San Francisco, CA (US)

(72) Inventors: Haricharan Lakshman, Sunnyvale, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/179,715

(22) Filed: Nov. 2, 2018

(65) Prior Publication Data

US 2019/0139296 A1    May 9, 2019

Related U.S. Application Data

(60) Provisional application No. 62/582,445, filed on Nov. 7, 2017.

(51) Int. Cl.

| | |
|---|---|
| *G06T 15/08* | (2011.01) |
| *G06T 3/40* | (2006.01) |
| *G06T 3/00* | (2006.01) |
| *G06T 7/593* | (2017.01) |
| *G09G 5/14* | (2006.01) |
| *H04N 19/107* | (2014.01) |

(52) U.S. Cl.
CPC ............ *G06T 15/08* (2013.01); *G06T 3/0062* (2013.01); *G06T 3/0093* (2013.01); *G06T 3/4038* (2013.01); *G06T 7/596* (2017.01); *G09G 5/14* (2013.01); *H04N 19/107* (2014.11); *G06T 2215/16* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| | | | |
|---|---|---|---|
| 9,451,232 B2 | 9/2016 | Ward | |
| 2013/0127854 A1* | 5/2013 | Shpunt | G01B 11/2518 345/420 |
| 2015/0287158 A1* | 10/2015 | Cerny | G06F 3/013 345/553 |
| 2015/0287166 A1* | 10/2015 | Cerny | G02B 27/0172 345/423 |

(Continued)

OTHER PUBLICATIONS

Levoy, M. et al "Light Field Rendering" Proc. Siggraph 1996.

(Continued)

*Primary Examiner* — Todd Buttram

(57) ABSTRACT

A target view to a 3D scene depicted by a multiview image is determined. The multiview image comprising sampled views at sampled view positions distributed throughout a viewing volume. Each sampled view in the sampled views comprises a wide-field-of-view (WFOV) image and a WFOV depth map as seen from a respective sampled view position in the sampled view positions. The target view is used to select, from the sampled views, a set of sampled views. A display image is caused to be rendered on a display of a wearable device. The display image is generated based on a WFOV image and a WFOV depth map for each sampled view in the set of sampled views.

20 Claims, 13 Drawing Sheets

(56) References Cited

U.S. PATENT DOCUMENTS

| | | | |
|---|---|---|---|
| 2015/0287167 A1* | 10/2015 | Cerny | G06T 17/10 |
| | | | 345/423 |
| 2016/0253809 A1* | 9/2016 | Cole | H04N 13/344 |
| | | | 345/672 |
| 2018/0293752 A1 | 10/2018 | Ninan | |
| 2018/0295351 A1 | 10/2018 | Ninan | |
| 2018/0359489 A1 | 12/2018 | Lakshman | |
| 2019/0104309 A1 | 4/2019 | Su | |

OTHER PUBLICATIONS

Gortler, S. et al "The Lumigraph", Proc. Siggraph 1996.
ITU-T H.264 "Advanced Video Coding for Generic Audiovisual Services" May 2003.
ITU-T H.265 "High Efficiency Video Coding" Apr. 2013.
Peleg, S. et al "Omnistereo: Panoramic Stereo Imaging" IEEE Transactions on Pattern Analysis and Machine Intelligence vol. 23, No. 3, Mar. 2001,pp. 279-290.

\* cited by examiner determine a target view to a 3D scene depicted by a multiview image 402 use the target view to select, from sampled views of the multiview image, a set of sampled views 404 cause a display image to be rendered on a display of a wearable device of a user 406

FIG. 4A receive a WFOV image and a WFOV depth map for each sampled view 422 warp the WFOV image to a warped image of a target view based on the WFOV depth map 424 blend warped images of the target view into a blended warped image of the target view 426 cause a display image derived from the blended warped image of the target view to be rendered on a display of a wearable device 428

FIG. 4B

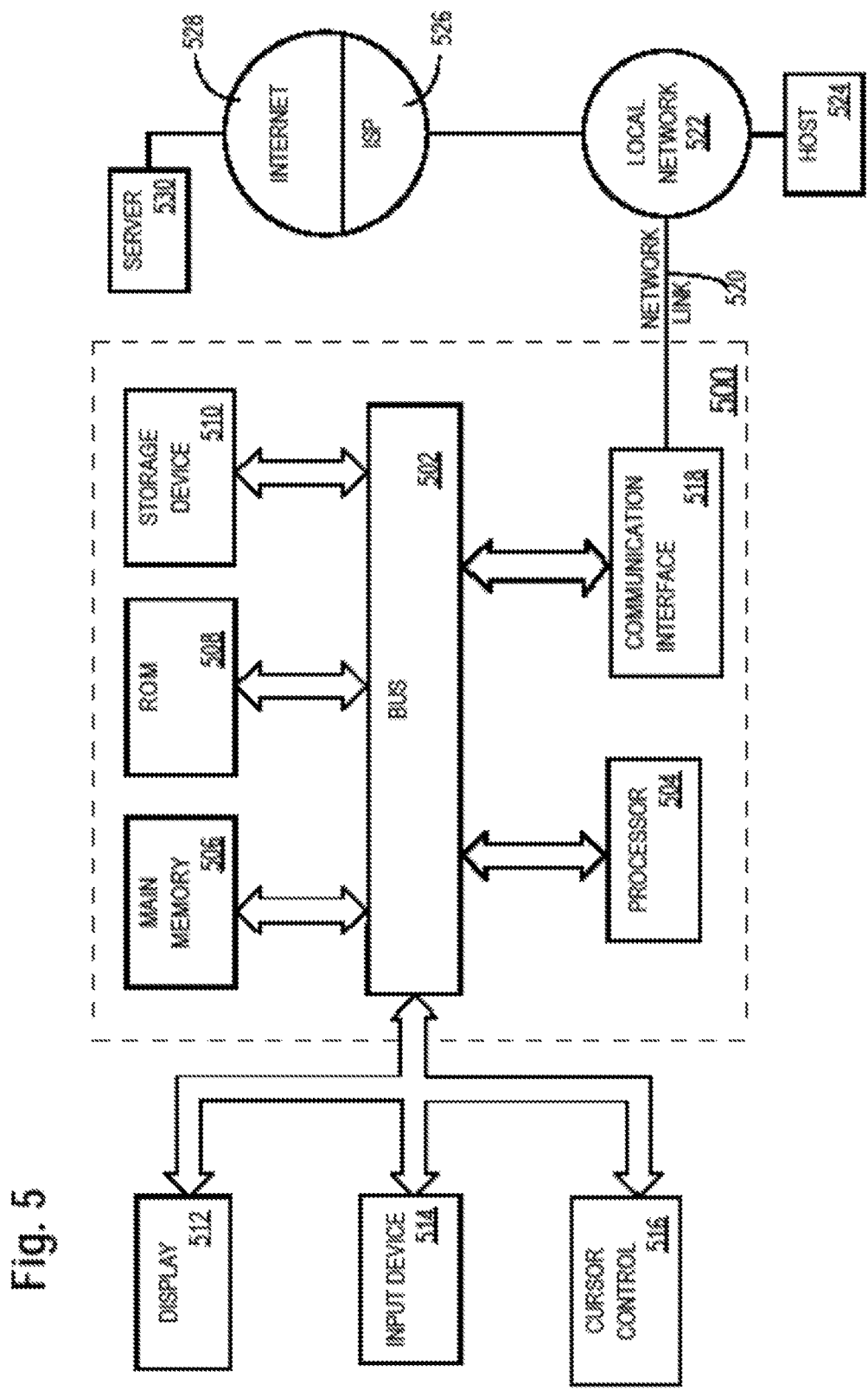

PARAMETERIZING 3D SCENES FOR VOLUMETRIC VIEWING

CROSS REFERENCE TO RELATED APPLICATIONS

This application claims priority to U.S. Provisional Patent Application No. 62/582,445, with an application title of "PARAMETERIZING 3D SCENES FOR VOLUMETRIC VIEWING," filed on Nov. 7, 2017, the entire contents of which are hereby incorporated by reference as if fully set forth herein.

TECHNOLOGY

The present invention relates generally to images and video, and in particular, to parameterizing three-dimensional (3D) scenes for volumetric viewing.

BACKGROUND

Under some multiview video coding techniques, a one-dimensional (1D) array of single-view images can be used to generate target views along a baseline, for example in autostereoscopic display applications. These techniques support a relatively limited number of video applications such as television image viewing by a viewer who can move horizontally along the baseline. In many other applications, however, a viewer may move viewpoints freely in a spatial area or a spatial volume, not necessarily along any baseline. Thus, a 1D array of single-view images may be insufficient to generate target views of viewpoints away from a baseline and to fill in relatively numerous pixels that are to be disoccluded in these target views.

Under light field (LF) based video coding techniques, image based rendering covering target views can be performed with a two-dimensional (2D) array of textures, if sampled views represented in the 2D array of texture images are sufficiently dense. While redundancy among the texture images can be exploited to an extent, it is still difficult to achieve simultaneously high coding efficiency for and random access in the numerous sampled views. Extending the 2D array to a three-dimensional (3D) viewing volume further entails storing many more sampled views (with high redundancy) in very large data stores. Capturing a sufficiently dense set of sampled views could also be very difficult if not impossible in many scenarios.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

FIG. 5 illustrates an example hardware platform on which a computer or a computing device as described herein may be implemented.

DESCRIPTION OF EXAMPLE EMBODIMENTS

Figure 1A:
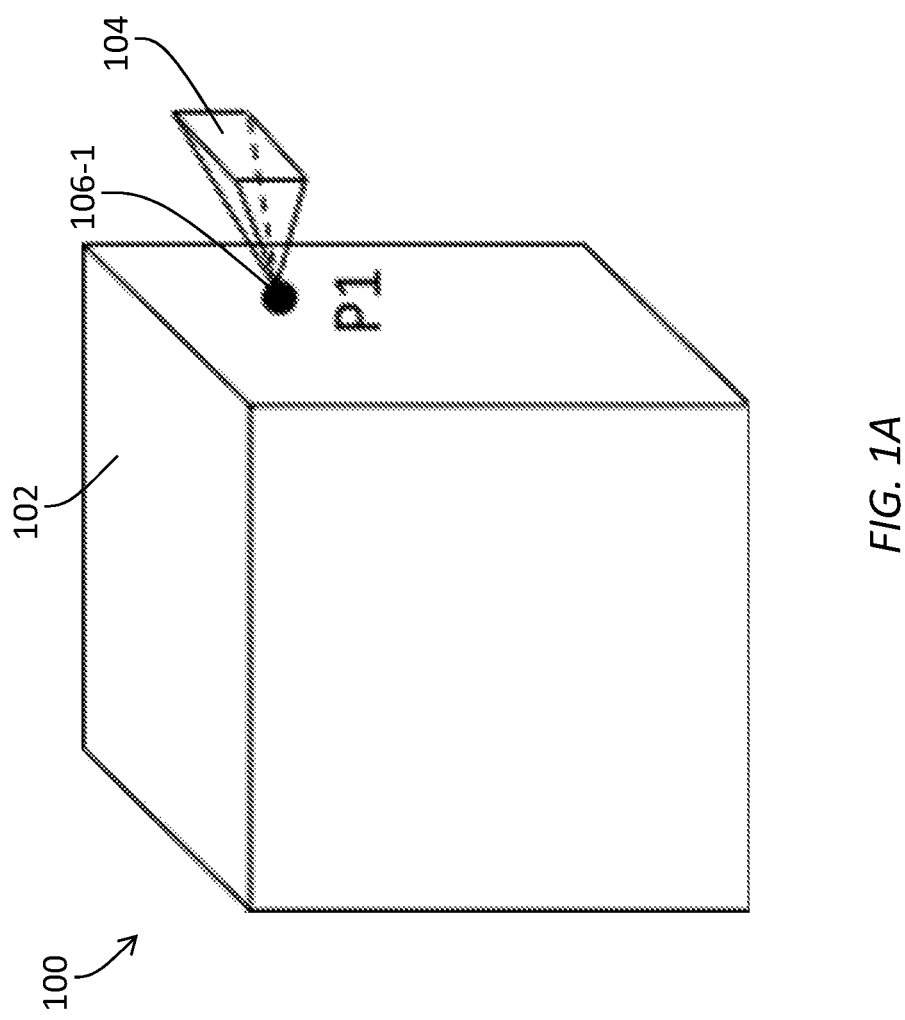
FIG. 1A and FIG. 1B illustrate example images as viewed from view positions of a viewing volume.

Example embodiments, which relate to parameterizing 3D scenes for volumetric viewing, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. WIDE-FIELD-OF-VIEW PARAMETERIZED REPRESENTATION
3. CONSTRUCTING IMAGES WITH SURFACE-BASED REPRESENTATION
4. CONSTRUCTING IMAGES WITH WFOV PARAMETERIZED REPRESENTATION
5. SELECTING SAMPLED VIEWS FOR GENERATING TARGET IMAGES
6. EXAMPLE IMAGE PROCESSING PIPELINE
7. COMPRESSING IMAGE AND DEPTH DATA IN SELECTED VIEWS
8. CAPTURING/PRODUCING MULTIVIEW IMAGES
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

In immersive 3D video applications such as virtual reality (VR) and augmented reality (AR), display images are updated in response to a viewer's head motions to provide immersive and comfortable viewing experiences. In a viewing volume (e.g., a spherical volume, a 3D space of one cubic meter, a cylindrical volume, a tetrahedral volume, etc.), the viewer can freely make head (or body) motions to choose or move to a view position and a view direction arbitrarily within the viewing volume and get correct perspectives to visual objects depicted in a 3D scene (or a 3D image space) with the display images rendered to the viewer.

Light field image-based rendering with densely sampled views can synthesize target views (e.g., novel views, non-sampled views, etc.), and even reproduce correct view dependent effects in the target views. However, capturing a dense light field of texture images could be very difficult or physically impossible in many scenarios, for example due to camera/lens sizes and issues related to fields of views, densities of sampled views, etc.

Relatively sparsely sampled views in conjunction with 3D reconstruction (e.g., computer vision based approaches, etc.) can be used to render the target views like in computer games, yet reconstructing 3D models for arbitrary dynamic scenes is difficult and tends to be generally error prone. Furthermore, many video codecs such as HEVC codecs do not support efficiently compressing 3D models and data associated with such 3D models. While alternative compression methods for 3D models may be emerging, the coding/compression efficiency of these methods is still not sufficiently high, especially if compared with block-based hybrid video coding methods that have undergone engineering optimizations.

Under some non-raster-image-based approaches such as ray-based light field representation, the air is assumed to be optically transparent; the radiance along a light ray through empty space or the air is assumed to remain constant. Light rays of a light field that enter an enclosing surface (e.g., a convex hull, faces of a cube, etc.) of a bounded space (e.g., a spherical volume, a cube, a cylindrical volume, a tetrahedral volume, etc.) such as a viewing volume can be indexed by determining values of a 5D plenoptic function—which describes or defines the light field—along the surface of the bounded space. More specifically, the 5D plenoptic function can be reduced to a 4D function by a 360-degree parameterization of the light field on the surface of the bounded space. The correct light rays may be retrieved from the 4D function on the surface of the bounded space for rendering images in the desired perspectives to both eyes of a viewer with view directions and view positions located in the bounded space.

Storing the light field on the surface of the bounded space under these approaches might appear convenient for rendering. However, it is rather difficult to store the light field on the surface efficiently in practice, considering the interaction between decoders and renderers. For example, efficiently compressing/encoding and decompressing/decoding light field data over time such as using motion compensation in a light ray space (e.g., a 4D light ray space, etc.) can be difficult. To tackle the compression problem, it is possible to re-parameterize the ray-based light field into a raster-based format, specifically, a 2D set of 2D images. However, in this case, the total number of views that need to be encoded and decoded from the stored light field on the surface of the bounded space becomes very high in order to render, for example, an arbitrary virtual view at an arbitrary view position within the bounded space.

In contrast with these approaches, techniques as described herein provide a compression-friendly representation for a light field by parameterizing a viewing volume with wide field-of-view (WFOV) sampled images and WFOV sampled depth maps at each sampled view position in a 3D distribution of sampled view positions that comprise all or mostly sampled view positions interior to the viewing volume.

A multiview image made up of the WFOV sampled images and the WFOV sampled depth maps that are used to parameterize the viewing volume can efficiently produce a target field-of-view image with an arbitrary target view direction from an arbitrary target view position—not among the sampled view positions of the viewing volume by the multiview image—within the viewing volume, for example by performing warping operations on nearby WFOV sampled images at sampled view positions close to the target view position based on nearby sampled WFOV depth maps.

A time sequence of multiview images in the WFOV parameterized representation is capable of efficiently supporting six degrees of freedom in head motion (e.g., three axis rotations and three axis translations) for omnidirectional scenes in the viewing volume in immersive video applications, as well as comprises raster image data and depth data that are amenable to being efficient compressed or decompressed with a wide variety of available and emerging video codecs by exploiting redundancy among the raster image data and the depth data of neighboring sampled views to achieve relatively high efficiencies in compression.

Under techniques as described herein, hybrid approaches such as depth image based rendering (DIBR) can be implemented to use depth images (or depth maps) as basic geometry tools (e.g., directly, as a starting point, etc.) to aid image based rendering.

For example, a multiview image at a given time instant may comprise a plurality of WFOV sampled images (or raster image data) and a plurality of corresponding WFOV sampled depth maps for a 3D set of sampled view positions in a viewing volume. Each WFOV sampled image in the plurality of WFOV sampled images and its corresponding WFOV sampled depth map in the plurality of corresponding WFOV sampled depth maps cover up to the same panoramic view (e.g., a 180-degree×360-degree view, a 90-degree×360-degree view, a 180-degree×180-degree view, etc.) for a respective sample view position in the 3D set of sampled view positions.

Neighboring WFOV sampled images selected from the plurality of WFOV sampled images can be warped and blended to synthesize a texture image of a target viewpoint that is not represented in the plurality of WFOV sampled images that are used to parameterize the viewing volume. The target viewpoint may refer to a viewer's relatively narrow field of view (e.g., non-panoramic, a 45-degree×110-degree field of view, a 60-degree×110-degree field of view, etc.) at a given time that can be computed/estimated/determined based on a spatial position and a spatial direction of a wearable device of the viewer at the given time.

Techniques as described herein can be used with 3D technologies to provide augmented entertainment experiences. The augmented entertainment experiences may be provided with shared displays such as those related to any of: Dolby 3D, RealD, linear polarization based 3D, circular polarization based 3D, spectral spatial separation based 3D, etc. The augmented entertainment experiences may also be provided with movable device displays such as those related to image projectors on wearable devices, VR displays, AR displays, HoloLens displays, Magic Leap displays, Mixed Reality (MR) displays, tensor displays, volumetric displays, light field (LF) displays, Immy displays, Meta displays, etc. Example wearable devices and device displays can be found in U.S. Provisional Patent Application No. 62/484,157, with an application title of "AUGMENTED 3D ENTERTAINMENT SYSTEMS" by Ajit Ninan and Neil Mammen, filed on Apr. 11, 2017, the entire contents of which are hereby incorporated by reference as if fully set forth herein.

These techniques can be used to support real time video applications, near-real-time video applications, non-real-time video applications, VR applications, AR applications, remote presence applications, automobile entertainment applications, helmet mounted display applications, heads up display applications, games, 2D display applications, 3D display applications, multiview display applications, etc.

Example embodiments described herein relate to selecting sampled views of multiview images. A target view to a 3D scene depicted by a multiview image is determined. The multiview image comprises a plurality of sampled views at a plurality of sampled view positions distributed throughout a viewing volume. Each sampled view in the plurality of sampled views of the multiview image comprises a wide-field-of-view (WFOV) image and a WFOV depth map corresponding to the WFOV image. Each sampled view of the multiview image in the plurality of sampled views of the multiview image corresponds to a respective sampled view position in the plurality of sampled view positions. The target view is used to select, from the plurality of sampled views of the multiview image, a set of sampled views. Each sampled view in the plurality of sampled views corresponds to a respective viewpoint to the 3D scene. A display image is caused to be rendered on a display of a wearable device of a user. The display image being generated based on one or more portions of the WFOV image and one or more portions of the WFOV depth map for each such sampled view in the set of sampled views.

Example embodiments described herein relate to constructing display images from sampled views of multiview images. One or more portions of a wide-field-of-view (WFOV) image and one or more portions of a WFOV depth map for each sampled view in a set of sampled views of a multiview image are received. Each sampled view in the set of sampled views corresponds to a respective viewpoint in a set of viewpoints to a 3D scene. The one or more portions of a wide-field-of-view (WFOV) image for each such sampled view in the set of sampled views are warped to a set of warped images of a target view based on the one or more portions of a WFOV depth map for each such sampled view. The set of warped images of the target view is blended into a blended warped image of the target view. A display image derived at least in part from the blended warped image of the target view is caused to be rendered on a display of a wearable device.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Wide-Field-of-View Parameterized Representation

Under techniques as described herein, instead of representing a light field in a light ray function (e.g., a 5D plenoptic function, a 4D function constrained to a surface, etc.), the light field is represented with a multiview image obtained by parameterizing a viewing volume with a 3D set of sampled view positions within the viewing volume. More specifically, the techniques as described herein use a set of WFOV sampled images and a set of WFOV sampled depth maps in the multiview image to represent the light field. Each WFOV sampled image in the set of WFOV sampled images corresponds to a respective sampled position in the set of sampled view positions and represents, for example along with a corresponding sampled depth map, a sampled view to a 3D scene (or a 3D image space) as viewed from the respective sampled view position. Depth information for pixels or visual objects depicted in each WFOV sampled image in the set of WFOV sampled images is contained in the corresponding sampled depth map in the set of sampled depth maps. Such depth information may be specified in reference to a coordinate system, in reference to a respective sampled position to which each such WFOV sampled image corresponds, and so forth.

As used herein, the term "wide field of view", "WFOV", "panorama" or "panoramic" may refer to a field of view to a 3D scene that covers much more (e.g., twice, 50%, 150%, etc.) than and/or (additionally, optionally or alternatively) comparable to a viewer's viewport to the 3D scene. Example panoramic view as described herein may include, without limitation, a 180-degree×360-degree view direction range, a 90-degree×360-degree view direction range, a 180-degree×180-degree view direction range, a cylindrical view direction range, a tetrahedral view direction range, a spherical view direction range, a view direction range represented with surfaces other than cylindrical surfaces, spherical surfaces, tetrahedral surfaces, six cubic faces of a cube, etc. In a nonlimiting example, a WFOV (or panoramic) image or a WFOV depth map may refer to an omnidirectional image or an omnidirectional depth map that cover all directions (e.g., without warping, without spatial or angular resampling, etc.) originated from a specific view position, for example within the viewing volume.

Figure 1B:
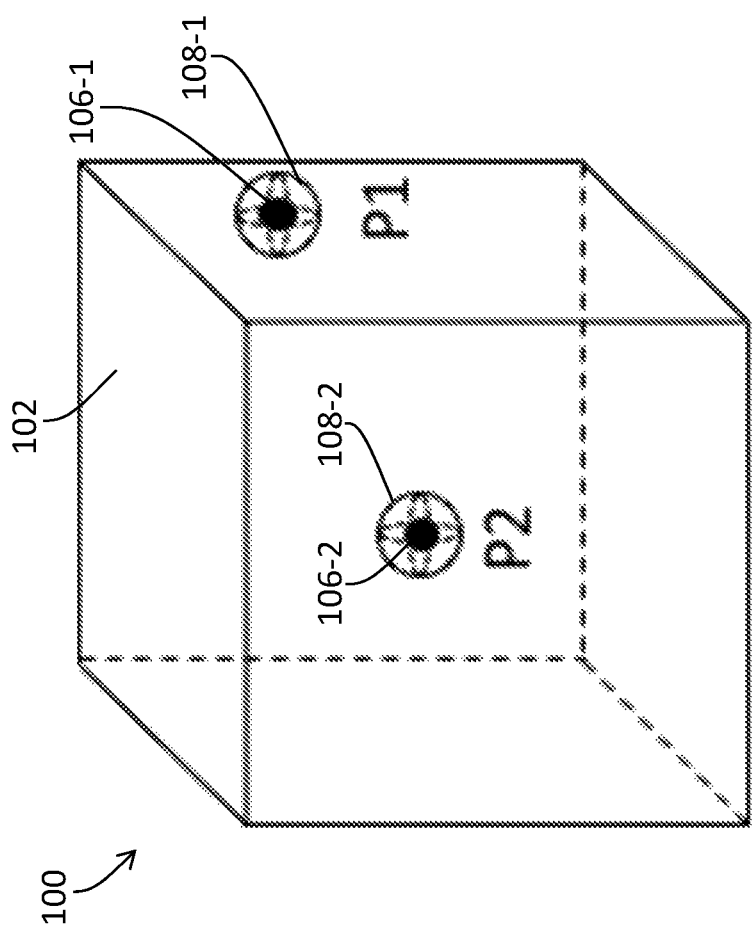

FIG. 1A and FIG. 1B illustrate example non-WFOV and WFOV images as viewed from view positions of a viewing volume (e.g., a cube, etc.) 100, respectively. As shown in FIG. 1A, the viewing volume (100) may comprise an outer surface (or enclosing surface) 102. A non-WFOV image 104 is originated from a first view position 106-1 (denoted as "P1") to cover a limited field of view with a relatively small solid angle (e.g., 30 degrees, less than 90 degrees, etc.). In contrast, as shown in FIG. 1B, two WFOV images 108-1 and 108-2 are originated from the first view position (106-1) and a second view position 106-2, respectively. The second view position (106-2) is an interior view position within the viewing volume (100) and is denoted as "P2". Each of the WFOV images (108-1 and 108-2) covers a wide field of view with a relatively large solid angle (e.g., panoramic, omnidirectional, 180 degrees×360 degrees, 180 degrees× 180 degrees, 90 degrees×360 degrees, 90 degrees×180 degrees, etc.) and represents a panoramic image.

In embodiments in which a multiview image is in the WFOV parameterized representation as described herein, each sampled view position (of the multiview image) in the viewing volume comprises a WFOV sampled image, which represents a panoramic texture image (or raster image data) stored with corresponding panoramic depth data as represented by a corresponding WFOV sampled depth map of each such sampled view. Sampled views of the multiview image are originated from sampled view positions most if not all of which are distributed throughout the viewing volume.

At the first sight, this representation might seem storing redundant data as compared with some other approaches such as surface-based light field representations, as it might be theoretically possible to recover a light ray for an inside viewpoint (represented by a view position and a view direction that are originated from the interior region of the viewing volume) from a corresponding light ray on the surface of the viewing volume given constant radiance along a light ray through empty space (or the air).

As it turns out, it is difficult for alternative representations such as surface-based light-field representations (e.g., the two-plane parameterized light field representation, etc.) to provide a recipient device with capabilities to use a relatively small number of sampled views to synthesize images for target views. It is also difficult for these alternative representations to support trade-off flexibility between viewing volume properties and file size, etc.

In contrast with these alternative representations, the WFOV parameterized representation under techniques as described herein can bring about a number of benefits including but not necessarily limited to only, any of: a recipient device (e.g., a wearable device, a video decoder, an image rendering device, etc.) can synthesize texture images for target field of views (e.g., virtual views, non-sampled views, etc.) with arbitrary view positions and/or arbitrary view directions originated from a viewing volume; the recipient device can use the texture images to render high-quality display images for the target field of views; the recipient device can use a relatively small number of sampled images to synthesize the texture images for the target fields of views; flexible trade-offs between viewing volume properties and file size can be supported; etc.

3. Constructing Images with Surface-Based Representation

Figure 2A:
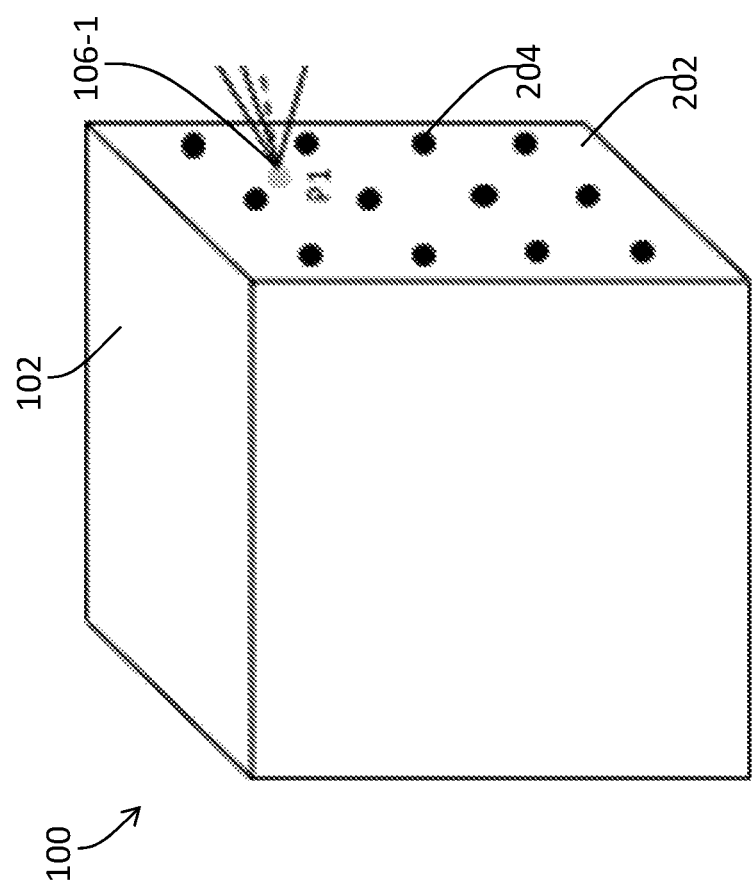
FIG. 2A illustrates example construction of a target image using light rays of a light field as constrained to an outer surface of a viewing volume.
Figure 2B:
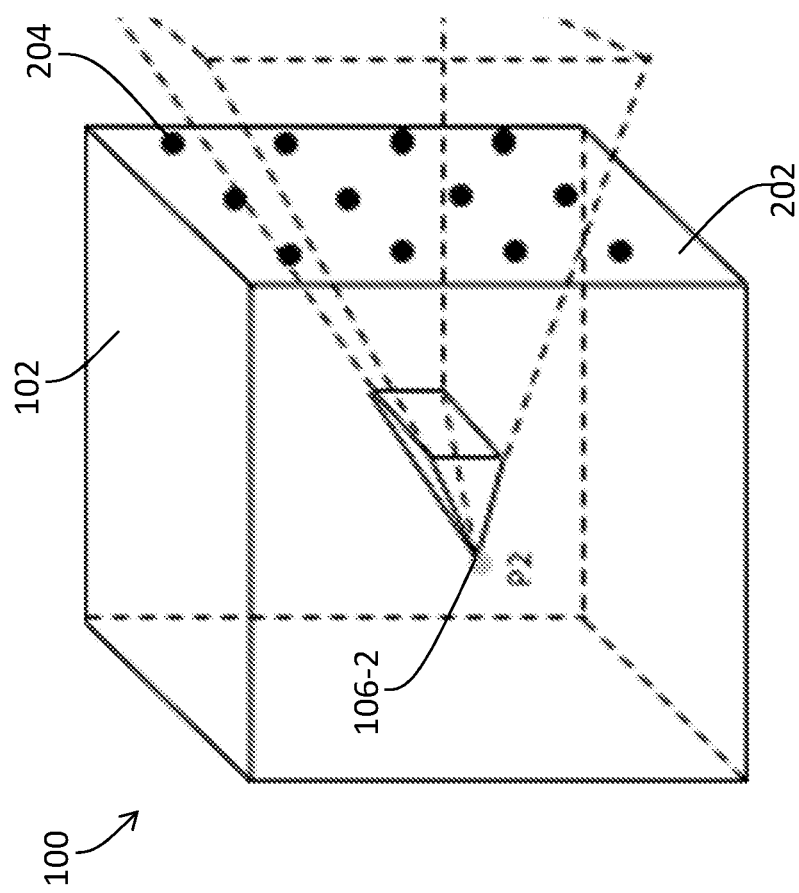
FIG. 2B and FIG. 2C illustrate example constructions of target views originated from target view positions inside a viewing volume.

FIG. 2A and FIG. 2B illustrate example constructions of target images using light rays of a light field as constrained to the outer surface (102) of the viewing volume (100) in a two-plane parameterized light field representation. Due to the constraint to the outer surface (102), a 5D (e.g., three translational dimensions of view positions and two angular dimensions of view directions, etc.) light field is effectively reduced to a 4D (e.g., two translational dimensions of view positions and two angular dimensions of view directions, etc.) light field.

The 4D light field may be parameterized as a 2D array of 2D textures each of which captures/represents light rays passing through a sampled view positions on the outer surface (102) over a respective limited field of view. The 2D array may be defined as an array of two dimensions/coordinates that span the outer surface (102). The 2D textures may represent light rays within the limited field of views. The light rays may be defined as values of two dimensions/coordinates that span a limited solid angle encompassed in the limited field of view.

In the case of the viewing volume being a cube, the enclosing surface (102) comprises six faces (e.g., one of which may be 202 of FIG. 2A and FIG. 2B, etc.) of the cube. The 4D light field on the enclosing surface (102) comprises six sets (e.g., one of which may be 204 of FIG. 2A and FIG. 2B, etc.) of two-plane parameterized light fields for the six faces of the cube.

The 2D array of 2D textures can be used to perform a purely image-based rendering using ray space interpolation (without any need for depth maps). The image-based rendering could produce satisfactory results, if sampled views are sufficiently dense. A significant drawback of the image-based rendering is that capturing a sufficiently dense set of sampled views could be very difficult if not impossible in practice.

To produce a target image with a target field of view that originates from an interior position of the viewing volume (100), light rays in the 4D light field as parameterized on the enclosing surface (102) may be extended into the viewing volume (100). When the interaction between decoding and rendering is considered, a further significant drawback of the image-based rendering becomes evident as follows.

As illustrated in FIG. 2A, in cases in which a target field of view (or a virtual viewpoint) is originated from a target view position (e.g., P1, etc.) that is also on the outer surface (e.g., 202, etc.) of the viewing volume (100), then selected sampled views with a limited number of selected sampled view positions nearest to the target view position (P1) may be decoded. Ray space interpolation may be used to construct a target image for the target field of view from the selected sampled views. The target image may be rendered to a viewer.

On the other hand, as illustrated in FIG. 2B, in cases in which a target field of view (or a virtual viewpoint) is originated from a target view position (e.g., P2, etc.) that is not on the outer surface (e.g., 202, etc.) of the viewing volume (100) but that is rather in the interior of the viewing volume (100), then selected sampled views with a relatively large number of selected sampled view positions, up to all sampled views in this representation, need to be decoded. Light rays from the selected sampled views with the relatively large number of selected sampled view positions need to be traced out in order to see if any of these light rays passes through the target view position (P2). Ray space interpolation may be further used to construct a target image for the target field of view from the selected sampled views. The target image may be rendered to a viewer.

As illustrated in FIG. 2A and FIG. 2B, in the two-plane parameterized light field representation, sampled views are only available on the outer surface (102) of the viewing volume (100). Light rays from many sampled views, up to all sampled views, would be needed for rendering a virtual view (or a target view) at an interior view position such as P2. Hence, it is difficult for such representation to provide a recipient device with capabilities to decode or use a relatively small number of sampled views to synthesize images for target views, to support trade-off flexibility between viewing volume properties and file size, etc.

4. Constructing Images with WFOV Parameterized Representation

Under techniques as described herein, a viewing volume (e.g., 100) is parameterized in a WFOV parameterized representation using a set of WFOV sampled images (or panoramic textures) and a set of WFOV depth maps (or panoramic depth data) with viewpoints represented by view positions and panoramic views (or wide fields of views) distributed throughout the viewing volume (100). While the WFOV sampled images and the WFOV depth maps might appear to contain redundant data, the WFOV sampled images and the WFOV depth maps can be efficiently compressed given that video codecs are capable of efficiently identifying redundancies in image and depth data.

The WFOV parameterized representation as described herein can be used to achieve the previously discussed benefits for the following reasons.

First, the WFOV parameterized representation can be used to generate accurately synthesized views. For a target view (or a virtual viewpoint) in the viewing volume (100), a small set of sampled views with sampled view positions and/or directions neighboring the target view's position and/or direction can be identified from a multiview image that comprise sampled views distributed throughout the viewing volume (100).

An upstream device or a recipient device can perform depth-based texture warping on a correspondingly small set of sampled texture images in the small set of sampled views based on a correspondingly small set of sampled depth maps in the small set of sampled views to generate a correspondingly small set of warped texture images each of which has been warped to the target view. The small set of warped texture images can be blended or otherwise synthesized to generate a target texture image of the target view.

Since the sampled views in the multiview image are distributed throughout the viewing volume (100) in the WFOV parameterized representation, the small set of sampled views—identified as neighboring sampled views to the target view in the WFOV parameterized representation—provides sampled views much closer to the target view than sampled views available in other approaches such as based on the surface-based representations. As a result, the much closer sampled views available from the multiview image in the WFOV parameterized representation as described herein can synthesize the target texture image of the target view more accurately than the sampled views available in the other approaches such as based on the surface-based representations.

Second, the WFOV parameterized representation can be used to synthesize target views (or virtual views) using a relatively small total number of sampled views.

Figure 2C:
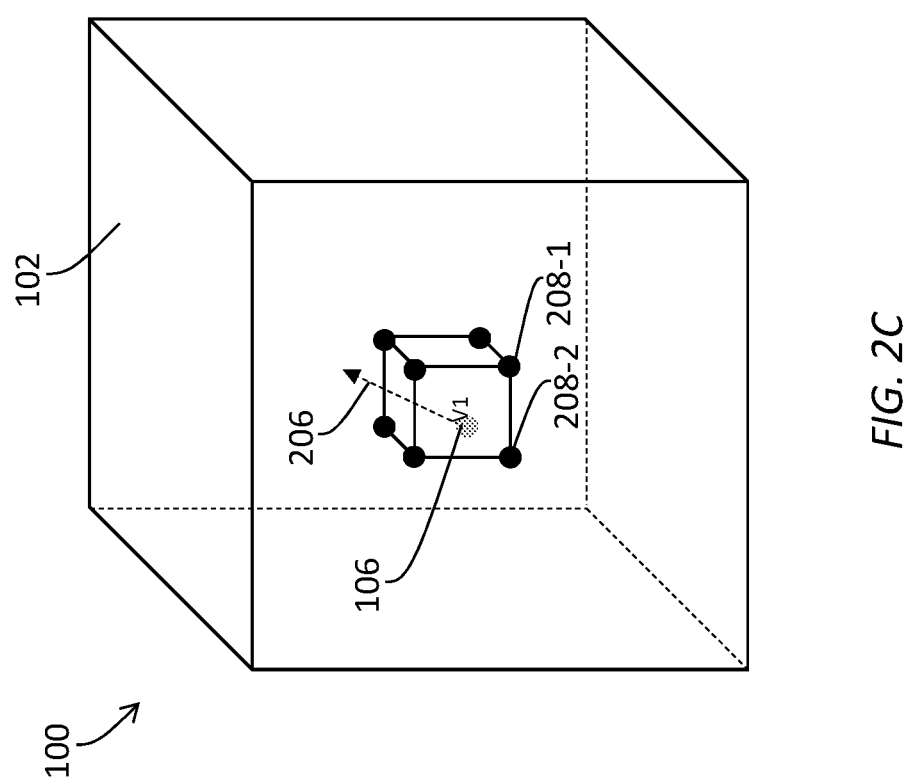

FIG. 2C illustrates an example construction of a target view that is oriented in a target view direction 206 and is originated from a target view position 106 (denoted as "V1"), inside the viewing volume (100). A set of neighboring sampled views (e.g., 208-1, 208-2, etc.) in a multiview image in the WFOV parameterized representation may represent a proper subset of sampled views in a plurality of sampled views in the multiview image, and may be identified based on one or both of the target view position (106) and/or the target view direction (206).

Since each sampled view in the neighboring sampled views (e.g., 208-1, 208-2, etc.) comprises a WFOV sampled image and a WFOV sampled depth map, it is sufficient to access these neighboring sampled views to access image and depth data for a target view's direction that is covered by wide fields of views in these neighboring sampled views, for example regardless of what the target view's direction is. As a result, synthesizing the target view can be based on the relatively small total number of sampled views in the set of neighboring sampled views, independent of the target view's position as well as independent of non-neighboring sampling views in the rest of the viewing volume (100).

Hence, the total number of sampled views for synthesizing target views (or novel views) under techniques as described herein does not need to scale with the total number of sampled views in the entire multiview image. The total number of sampled views to be decoded for synthesizing any target view may be readily restricted, for example below a limited number (e.g., a preset number, a default small number, 3, 4, etc.).

Third, the WFOV parameterized representation can be used to support trading off properties of viewing volume for file size. For example, how many sampled views of a multiview image are distributed throughout a viewing volume (e.g., 100, etc.) can be varied/manipulated. How the sampled views are distributed (e.g., uniformly, non-uniformly, denser sampled views in paracentral viewing positions, etc.) in the viewing volume (100) can be varied/manipulated. How many sampled views are to be coded in a bitstream can be varied/manipulated. What specific wide field of view covered in a sample image or a sample depth map can be varied to capture more or less parallax information in some specific directions. As a result, the WFOV parameterized representation as described herein offers a simple and elegant way to trade off viewing volume properties for file size (or data volume).

In addition, the WFOV parameterized representation as described herein is image based. As compared with light-ray based representations, sample images in a multiview image in the WFOV parameterized representation can directly contain relatively high-quality raster image data than those indirectly captured in the light-ray based representations. As a result, the sampled images in the WFOV parameterized representation can be used to generate relatively high-quality target images in terms of resolutions, dynamic ranges, color accuracies, image details, etc.

5. Selecting Sampled Views for Generating Target Images

A viewing volume (e.g., 100, etc.) as described herein may be of any shape including but not limited to any of: a cube, a rectangular volume, a spherical volume, a cylindrical volume, a tetrahedral volume, an irregular volume, up to a volume covering an entire venue, etc. The viewing volume (100) may be of any size including but not limited to any of: a cubic volume of a one-meter length on each side, a spherical volume with a 0.5-meter radius, a cylindrical volume of a 0.5-meter radius and a one-meter height, a tetrahedral volume bounded within a two meter cubic volume, up to an entire venue in a multiview video experience (e.g., for VR experience, for AR experience, etc.), etc. For a multiview image that comprises sampled images and sampled depth maps with panoramic views and with sampled view positions distributed throughout the viewing volume (100), viewpoint description data may be generated to define/specify the sampled view positions and/or the panoramic views. The viewpoint description data may be stored with the multiview image. Some or all of the viewpoint description data may be encoded as a part of image metadata with (e.g., all, selected, etc.) sampled images of the multiview image in a media stream (e.g., a coded bitstream, etc.) and delivered to one or more downstream recipient devices.

For the purpose of illustration, the viewing volume (100) represents a cubic volume that spans one meter along each of x-, y- and z-axes of a Cartesian coordinate system. A plurality of sampled views in a multiview image may be represented as a discrete distribution of sampled view positions in a uniform grid. Each sampled view position in the discrete distribution represents a corresponding sampled view and comprises a combination of a corresponding view position and a corresponding panoramic view. Each panoramic view, among panoramic views covered by the plurality of sampled views, may cover a wide field of view up to a full sphere.

It should be noted that in various embodiments, the sampled view positions covering the plurality of sampled views in the multiview image may or may not be represented with a uniform grid. In some embodiments, the plurality of sampled views may be represented by a discrete distribution of view positions in a non-uniform grid.

In some embodiments, denser view positions may be distributed at one or more central/paracentral/salient regions, than at other regions (e.g., in periphery, etc.), in the viewing volume (100). View directions covered by panoramic views in the plurality of sampled views of the multiview image may or may not be the same. For example, relatively large fields of views may be covered by panoramic views in sampled views with view positions distributed at one or more central/paracentral/salient directions.

For the purpose of illustration, four sampled positions may be distributed along each spatial axis (e.g., x, y, z, etc.) in the viewing volume (100) to form a uniform 4×4×4 grid in the cubic volume. Thus, the total number of sampled view positions in the multiview image is 4×4×4=64 sampled view positions. Under techniques as described herein, a sampled view at each sampled view position comprises a WFOV sampled image and a WFOV depth map.

A WFOV sampled image as described herein may be recorded or indexed as raster image data (e.g., pixel values, etc.) at surface positions (e.g., pixel positions, etc.) on one or more imaging surfaces. A specific surface position (or a specific pixel position) of the imaging surfaces that are used to record or index the raster image data of the WFOV sampled image can be readily mapped or transformed (e.g., conformal mappings, non-conformal mappings, angle-preserving mappings, non-angle-preserving mappings, etc.) into a specific viewing direction (or a specific viewing angle) within a wide field of view (e.g., greater than 70 degrees×110 degrees, hemispheric solid angle, spherical solid angle, no less than a solid angle of 2π steradians, etc.) covered in the WFOV sampled image, for example without additional input information. In these embodiments, a viewing direction that corresponds to a surface position (or a pixel position) of the imaging surfaces may be a single variable function (e.g., a transformation function depending on the choice of the imaging surfaces, a mapping function depending on the choice of the imaging surfaces, etc.) with the surface position (or the pixel position) being the single input variable to the single variable function.

Similarly, a WFOV sampled depth map as described herein may be recorded or indexed as depth data (e.g., depth, distance, parallax, spatial disparity, etc.) at surface positions (e.g., pixel positions, etc.) on one or more imaging surfaces, which may be the same used to record raster image data of a corresponding WFOV sampled image. A specific surface position (or a specific pixel position) of the imaging surfaces that are used to record or index the depth data of the WFOV sampled depth map can be readily mapped or transformed (e.g., conformal mappings, non-conformal mappings, angle-preserving mappings, non-angle-preserving mappings, etc.) into a specific viewing direction (or a specific viewing angle) within a wide field of view (e.g., greater than 70 degrees×110 degrees, hemispheric solid angle, spherical solid angle, no less than a solid angle of 2π steradians, etc.) covered in the WFOV sampled depth map, for example without additional input information, as discussed above in the case of a WFOV sampled image.

Figure 2D:
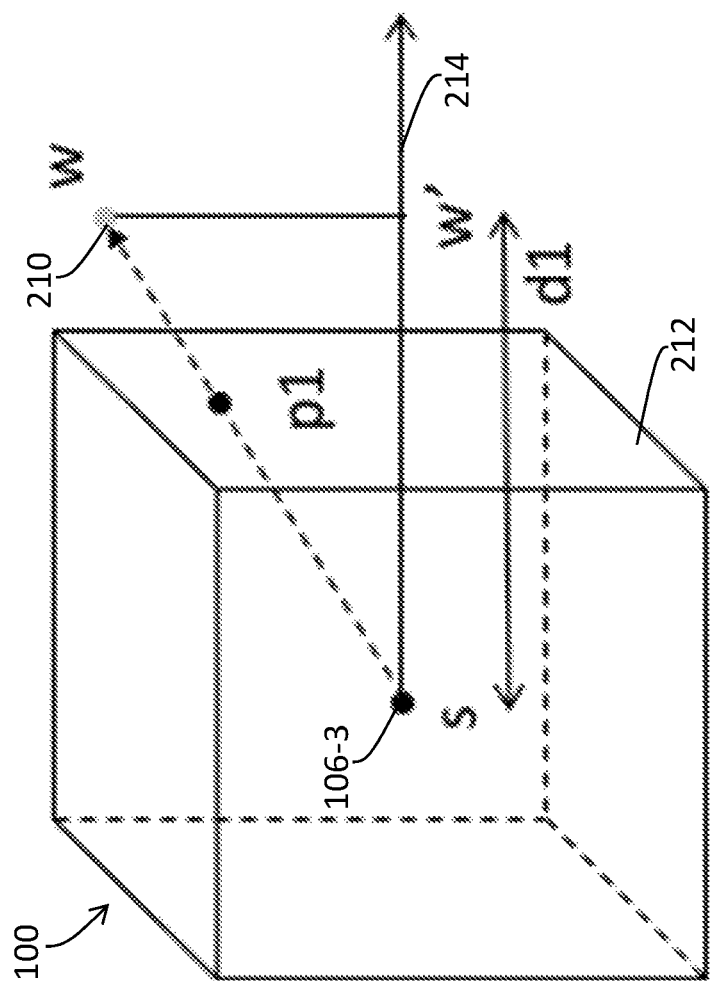
FIG. 2D through FIG. 2F illustrate example depth interpretations for a world point.

FIG. 2D illustrates an example depth interpretation for a world point 210 (denoted as "w") depicted in a sampled image in a sampled view at a sampled view position 106-3 (denoted as "s"). The sampled image comprises raster image data (e.g., pixel values, etc.), of world points as seen in the sampled view, recorded or indexed on cubic imaging surfaces (e.g., 212, etc.). Depth data of the world points as seen in the sampled view at the sampled view position (106-3) is also indexed or recorded on the cubic imaging surfaces (212). For example, image data (e.g., luma and chroma values, etc.) and depth data of the world point (210) in the sampled view is indexed or recorded as pixel values and depth values at a point (denoted as "p1") on the cubic imaging surfaces (212). In particular, the depth data for the world point (210) in the sampled view may comprise or indicate the projected distance d1 of the world point (210) between the sampled view position (106-3) (s) and a projected position "w" of the world point (210) (w) along an imaginary line 214 orthogonal to the cubic imaging surfaces (212).

Figure 2E:
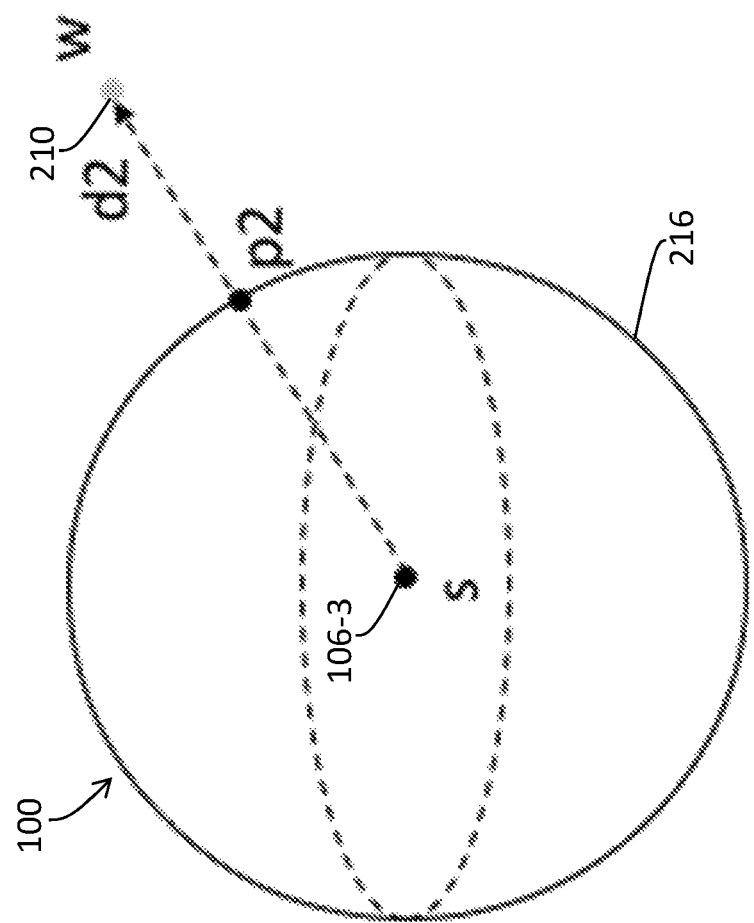

FIG. 2E illustrates another example depth interpretation for a world point (e.g., 210 as in FIG. 2D, etc.) depicted in a sampled image in a sampled view at a sampled view position (e.g., 106-3, etc.). The sample image comprises raster image data (e.g., pixel values, etc.), of world points as seen in the sampled view, recorded or indexed on a spherical imaging surface (e.g., 216, etc.). Depth data of the world points as seen in the sampled view at the sampled view position (106-3) is also indexed or recorded on the spherical imaging surface (216). For example, image data (e.g., luma and chroma values, etc.) and depth data of the world point (210) in the sampled view is indexed or recorded as pixel values and depth values at a point (denoted as "p2") on the spherical imaging surface (216). In particular, the depth data for the world point (210) in the sampled view may comprise or indicate the radial distance "d2" of the world point (210).

Figure 2F:
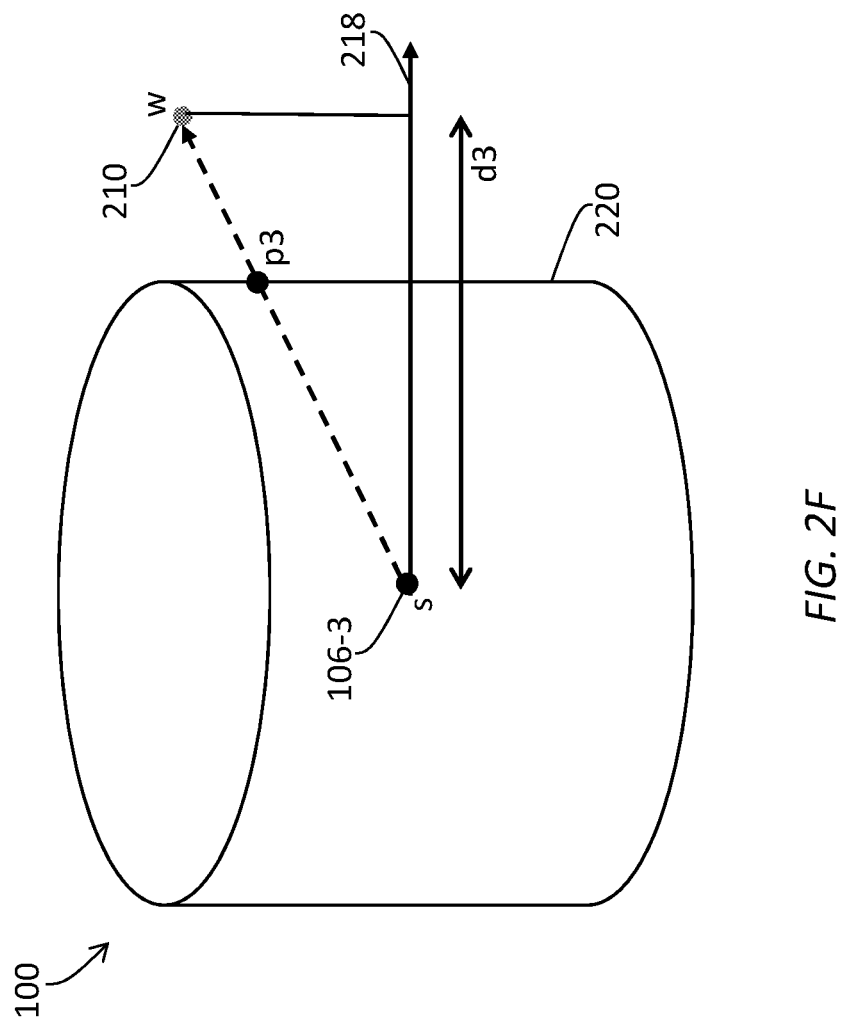

FIG. 2F illustrates an example depth interpretation for a world point (e.g., 210 as in FIG. 2D or FIG. 2E, etc.) depicted in a sampled image in a sampled view at a sampled view position (e.g., 106-3, etc.). The sample image comprises raster image data (e.g., pixel values, etc.), of world points as seen in the sampled view, recorded or indexed on a cylindrical imaging surface (e.g., 220, etc.). Depth data of the world points as seen in the sampled view at the sampled view position (106-3) is also indexed or recorded on the cylindrical imaging surface (220). For example, image data (e.g., luma and chroma values, etc.) and depth data of the world point (210) in the sampled view is indexed or recorded as pixel values and depth values at a point (denoted as "p3") on the cylindrical imaging surface (220). In particular, the depth data for the world point (210) in the sampled view may comprise or indicate the projected distance "d3" of the world point (210) along a transverse direction 218.

Once a sampled view position (e.g., 106-3 of FIG. 2D, FIG. 2E or FIG. 2F, etc.) is specified, light rays projecting out from the sampled view position intersect with various depicted objects at various world points as the light rays extend from the view position to these objects. The brightness and colors of the objects may be captured in image acquisition processed to generate luma and chroma values of the objects at the world points, and included as raster image data (e.g., pixel values, etc.) for the world points. The raster image data and the corresponding depth map data may be recorded on an imaging surface (e.g., the cubic imaging surface (212) of FIG. 2D, the spherical image surface (216) of FIG. 2E, the cylindrical image surface (220) of FIG. 2F, etc.).

Raster image data and corresponding depth map data on a planar imaging surface (e.g., a cubic imaging surface of FIG. 2D, etc.) are well suited to represent limited field-of-view (e.g., 90-degree, etc.) images. However, the length of the planar imaging surface is proportional to the tangent of half the field of view. Thus, extending the planar imaging surface to store raster image data or pixel values for wider fields of views would cause the length of the planar imaging surface to approach infinity as the field of view approaches 180 degrees in a length-wise direction. As a result, extending the planar imaging surface close to or beyond 180 degrees in the length-wise direction is difficult, if not at all impractical.

In some embodiments, for a wide field-of-view imagery, raster image data (pixel values) and depth map data can be indexed or recorded on multiple planar surfaces (e.g. cubic imaging surfaces, cubic maps, etc.) instead of a single planar surface. Additionally, optionally or alternatively, raster image data and depth map data can be indexed or recorded on one or more curved surfaces (e.g. a spherical imaging surface, spherical surfaces, cylindric surfaces, tetrahedral surfaces, etc.). For example, raster image data and depth map data can be indexed or recorded on a single spherical imaging surface such as illustrated in FIG. 2E or a single cylindrical imaging surface such as illustrated in FIG. 2F. It should be noted that, in various embodiments, these and other imaging surfaces may be used to record raster image data and corresponding depth map data under techniques as described herein.

Projection mappings can be used to transform raster image data (or pixel values) or corresponding depth map data recorded in one type of imaging surface to different types of imaging surfaces. For example, raster image data (or pixel values) or corresponding depth map data recorded on a curved surface (e.g., a spherical surface, etc.) can be mapped onto a rectangular plane using a projection mapping such as equirectangular projections and so forth to yield raster image data (or pixel values) and corresponding depth map data indexed or recorded on the rectangular plane, for example to yield pixel values of a plurality of pixels that form a rectangular grid.

A wide variety of surfaces may be used as imaging surfaces as described herein for recording raster image data and depth data. Example imaging surfaces for recording or indexing raster image data (or pixel values), light rays, depth map data, and so forth, may include, but are not necessarily limited to only, any of: a plane, a curved surface, multiple planar surfaces, spherical surfaces, regular surfaces, irregular surfaces, and so forth. Additionally, optionally or alternatively, as illustrated in FIG. 2D, FIG. 2E and FIG. 2F, depths can be computed or determined differently depending on types of imaging surfaces. Additionally, optionally or alternatively, a wide variety of projection mappings can be used to map raster image data (or pixel values), light rays, depth map data, and so forth, as recorded/indexed in one type of imaging surface to other types of imaging surfaces.

Properties of image and depth data saved in a multiview image as described herein may vary among sampled views of the multiview image. In a non-limiting example, fields of views for the sampled views can be distributed in a viewing volume such that only one sampled view at a corresponding sampled view position covers the entire 360 degrees of view directions with texture data (or raster image data) and depth data. Each sampled view in the rest of sampled views at the rest of sampled view positions in the multiview image covers only the front 180 degrees of lateral view directions with texture and depth. Here, the front 180 degrees of lateral view directions may represent an angular size/dimension of a solid angle centered along a front direction extending from a central point of the viewing volume to a specific world point in a 3D image space depicted by the multiview image. This is useful in cases in which there is a specific front direction from the viewing volume, such as a stage or field in the front of a viewer whose field of view originates from the viewing volume corresponding to a viewing position of an audience in the back. In these cases, when the viewer looks back from a non-sampled view, image data for the viewer's viewport (e.g., rendered in a display of the viewer's wearable device, etc.) can be determined by warping from only the one sampled view that covers the entire 360 degrees of view directions. If there are missing pixels in the viewer's viewport due to occlusions, hole-filling techniques such as replicating a background texture can be used to generate pixel values for the missing pixels in the viewer's viewport.

6. Example Image Processing Pipeline

Figure 3A:
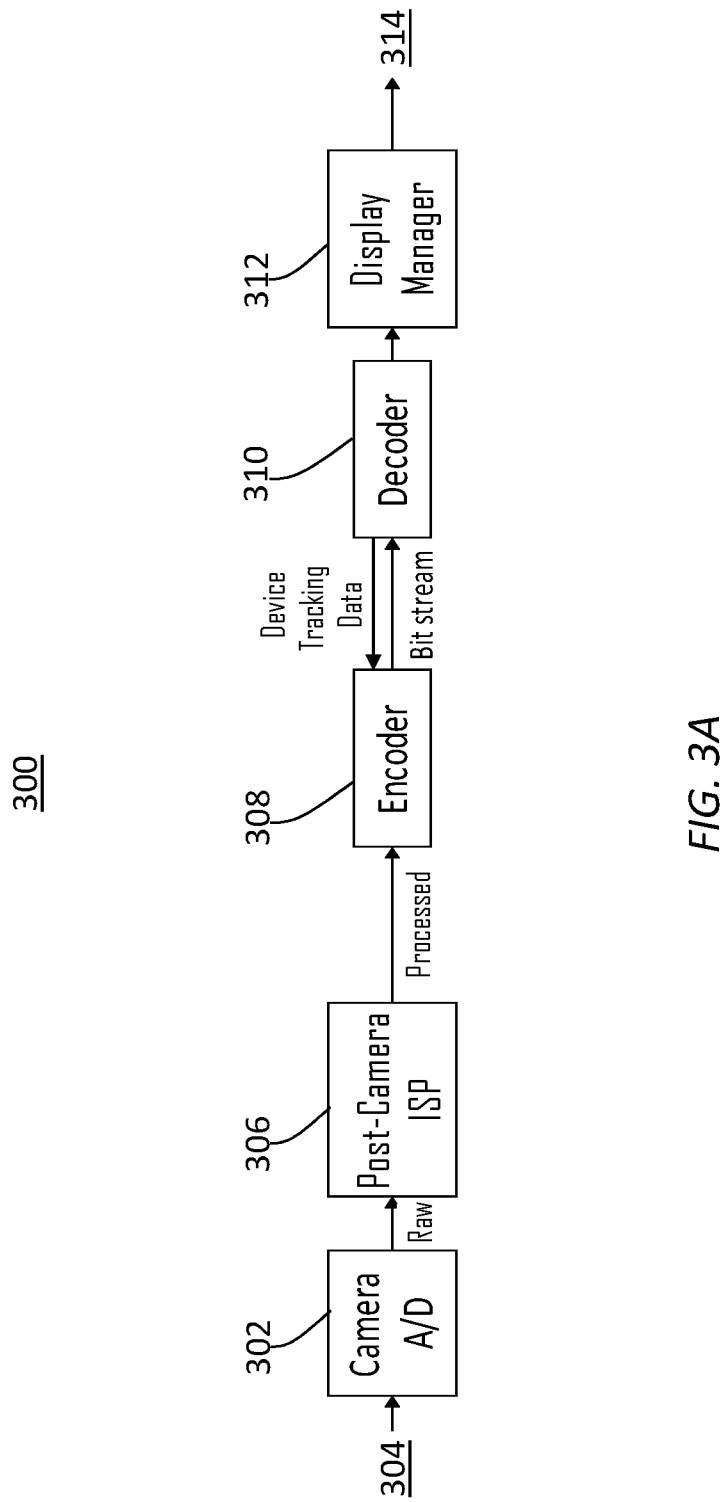
FIG. 3A illustrates an example image processing pipeline.

FIG. 3A illustrates an example image processing pipeline 300. In some embodiments, an image capturing device 302 (denoted as "Camera A/D") captures one or more raw multiview images 304 from a 3D scene. Each of the raw multiview images (304) may comprise a plurality of raw texture images corresponding to a plurality of raw sampled views.

In some embodiments, a post-camera image signal processor (ISP) 306 converts the one or more raw multiview images (304) into one or more processed multiview images (referred to simply as "multiview images"). A processed multiview image (referred to simply as "multiview image") comprises a plurality of processed sampled views (referred to simply as "a plurality of sampled views") as seen from a plurality of sampled view positions distributed throughout a viewing volume (e.g., 100 of FIG. 2A, FIG. 2B or FIG. 2C, etc.). To generate the multiview images for the plurality of sampled views, the post-camera ISP (306) may perform one or more post-processing operations, on the raw multiview images, that may include, but are not necessarily limited to only, any of: auto focus, image sharpening, white balancing, color corrections (e.g., skin tones, etc.), bad pixel corrections, non-linear pixel value mapping based on optical transfer functions, depth image generation based on disparity information in the raw multiview images and/or camera geometry information, image stitching (to create wide field of view image or panoramic image from multiple captured images), etc.

In some embodiments, each sampled view in a plurality of sampled views of a multiview image as described herein comprises a panoramic sampled image and a panoramic sampled depth map as seen from a sampled view position in the plurality of sampled view positions distributed throughout the viewing volume (100).

The post-camera ISP (306) and/or the image capturing device (302) can generate the disparity information by analyzing pixel correspondence relationships among different texture images based on intensity and/or chromaticity information in pixels of the texture images. In some embodiments, the disparity information may be obtained as a solution in a problem of minimizing a cost function defined based on intensity/chromaticity differences of pixels from different texture images. Additionally, optionally or alternatively, the depth images (or depth maps) can be obtained from the disparity information using camera geometry information.

The camera geometry information may include, but is not necessarily limited to only, any of: principal points of image planes of image sensors used to acquire raw images, optical centers of the image sensors, focal lengths of the image sensors, depths of image planes of the image sensors, spherical and/or linear skew factors in raw images, angular and positional relationships between the image sensors, etc.

In some embodiments, the camera geometry information can be obtained through calibrating the image acquisition device (302) before (e.g., at factory, in the field by an end user, etc.) the raw multiview images are acquired/captured by the image acquisition device (302).

In some embodiments, an upstream device such as a video encoder 308 in the image processing pipeline (300) receives real-time device tracking data of a wearable device from a downstream device such as a video decoder 310 in the image processing pipeline (300). The device tracking data enables the video encoder (308) to determine view positions (e.g., spatial positions, etc.) and/or view directions (e.g., spatial directions, etc.) of the wearable device at a plurality of time instants (or time points).

A target view at the given time instant, as indicated by a view position and a view direction of the wearable device at a given time instant in the plurality of time instants, may be determined by the video encoder (308) with minimal delay (e.g., 1 millisecond, 3 milliseconds, 5 milliseconds, etc.), within a strict realtime budget, etc., as measured from the given time instant.

Based on the target view, the video encoder (308) identifies a set of neighboring sampled views (e.g., a proper subset, eight nearest neighbors in case of a cubic lattice as illustrated in FIG. 2C, four nearest neighbors in a tetrahedral lattice, etc.) in the plurality of sampled views. The video encoder (308) accesses a panoramic sampled image and a panoramic depth map, of each sampled view, in the set of neighboring sampled views.

In some embodiments, the video encoder (308) encodes the panoramic sampled image and the panoramic depth map of each sampled view in the set of neighboring sampled views into a multiview video signal or bitstream; transmits/provides the multiview video signal or bitstream directly or through intermediate devices to the video decoder (310) in the downstream device; etc. Any combination of one or more video signal encoding methods in a variety of video signal encoding methods can be used.

In some embodiments, one or more "INTER_VIEW" prediction methods are used for compressing the amount of data to be transmitted from an upstream device to a downstream client device. Key view images, whether or not included in the set of neighboring sampled views, may be encoded along with any dependent view images that are of sampled views included in the set of neighboring sampled views into the multiview video signal or bitstream. Additionally, optionally or alternatively, zero, one or more other prediction methods (e.g., "INTER" prediction methods, "INTRA" prediction methods, etc.) other than the "INTER_VIEW" prediction methods can be used for prediction (or compression) in encoding some or all of the key view images and the dependent view images that are to be sent to the downstream device. Example "INTER_VIEW", "INTER", and "INTRA" prediction methods in connection with multiview images can be found in U.S. Provisional Patent Application No. 62/518,187, with an application title of "CODING MULTIVIEW VIDEO" by Haricharan Lakshman and Ajit Ninan, filed on Jun. 12, 2017, the entire contents of which are hereby incorporated by reference as if fully set forth herein.

In some embodiments, the video encoder (308) signals prediction methods used in encoding, operational parameters used in the prediction methods, (e.g., non-linear, etc.) mapping functions (e.g., optical transfer functions, electric transfer functions, perceptual quantization functions, HLG functions, gamma-based functions, tone mapping functions, inverse tone mapping functions, etc.) used in encoding, operational parameters (e.g., gamma value, min luminance, max luminance, mid-tone luminance, pivots, offsets, slopes, etc.) used in the mapping functions, etc., to the downstream device. For example, some or all of indexes or IDs identifying the prediction methods, indexes or IDs identifying the mapping functions, the operational parameters for these methods and/or functions, etc., may be encoded in-band (e.g., fill elements, header fields, etc., in image data payloads, etc.) or separately (e.g., as metadata fields, in a separate metadata sub-stream, etc.) from image data.

In some embodiments, the video decoder (310) operates with a device tracker (not shown) to collect the real-time device tracking data of the wearable device from the device tracker. The device tracking data of the wearable device may be transmitted by the video decoder (310) directly or through intermediate devices to the video encoder (308). Example device tracking and device trackers can be found in U.S. Provisional Patent Application No. 62/484,131, with an application title of "PASSIVE MULTI-WEARABLE-DEVICES TRACKING" by Ajit Ninan and Neil Mammen, filed on Apr. 11, 2017, the entire contents of which are hereby incorporated by reference as if fully set forth herein.

In some embodiments, the video decoder (310) receives the multiview video signal or bitstream; decodes the multiview video signal or bitstream into a panoramic sampled image and a panoramic sampled depth map of each sampled view in the set of neighboring sampled views received in the multiview video signal or bitstream; etc.

In cases in which one or more "INTER_VIEW" prediction methods are used for prediction (or compression), key view images that are of sampled views not included in the set of neighboring sampled views, may also be decoded along with (e.g., before, etc.) any dependent view images that are of sampled views included in the set of neighboring sampled views into the multiview video signal or bitstream. Additionally, optionally or alternatively, zero, one or more other prediction methods other than the "INTER_VIEW" prediction methods can be used for prediction (or compression) in decoding some or all of the key view images and the dependent view images that are received from the upstream device (e.g., the video encoder (308), etc.).

In some embodiments, the video decoder (310) extracts/retrieves some or all of the indexes or IDs identifying the prediction methods, the indexes or IDs identifying mapping functions, the operational parameters for these methods and/or functions, etc., from the multiview video signal or bitstream.

In some embodiments, the device tracking data as collected by the video decoder (310) operating in conjunction with the device tracker enables one or both of the video encoder (308) and the video decoder (310) to determine or share view positions (e.g., spatial positions, etc.) and/or view directions (e.g., spatial directions, etc.) of the wearable device at a plurality of time instants (or time points). A target view at the given time instant, as indicated by a view position and a view direction of the wearable device at a given time instant in the plurality of time instants, may be determined or shared by one or both of the video encoder (308) and the video decoder (310) with minimal delay (e.g., 1 millisecond, 3 milliseconds, 5 milliseconds, etc.), within a strict realtime budget, etc., as measured from the given time instant.

Based on the target view, the video decoder (310) warps decoded panoramic sampled images (or portions thereof) in the set of the neighboring sampled views to warped images of the target view using the corresponding decoded depth maps in the set of the neighboring sampled views. The warped images of the target view may be blended or synthesized into an overall warped image of the target view.

In some embodiments, the video decoder (310) sends/provides the overall image of the target view to a display manager 312.

In some embodiments, the display manager (312) operates with a display driver to generate a display image (314) from the overall texture image of the target view, and renders the display image (314) with a display of the wearable device with image details 314 as if it were originally captured by an image capturing device from the desired target position in the 3D scene (or the 3D image space).

In some embodiments, dynamically adaptive streaming may be used to deliver sampled images and sampled depth maps as described herein from a media streaming server (e.g., the upstream device, the video encoder (308), etc.) to a media streaming client (e.g., the downstream device, the video decoder (310), etc.).

Techniques as described herein can be used to support a number of fast rendering schemes with multiview images in the WFOV parameterized representation.

In some embodiments, rendering in connection with multiview images as described herein may be sped up using hemispheres to partition image and depth data. Sampled panoramic images (or source panoramic images) are of relatively wide fields of views such as 180 degrees to 360 degrees in each of the two angular dimensions/sizes spanning a solid angle, whereas a viewer's viewport (or target viewport) may be of a relatively narrow field of view such as 70 degrees or 110 degrees in each of the two angular dimensions/sizes spanning a solid angle per eye for wearable devices such as head mounted displays. Hence, at the rendering stage, not all source pixels in selected sampled panoramic images (e.g., at sampled view positions closest to the target view's position, etc.) need to be warped into the target viewport, as some of these source pixels can be determined as not visible in the target viewport.

In some embodiments, given the target view's direction, pixels in the selected sampled panoramic images can be split or partitioned into front and back hemispheres. Pixels partitioned into the back hemispheres can be ignored during image warping operations. If a recipient device or a video decoder supports random spatial access, for example using High-Efficiency-Video-Coding (HEVC) tiles, the textures and the depth maps for the back-hemisphere pixels may or may not even be decoded.

In some embodiments, rendering in connection with multiview images as described herein may be sped up using solid angle search. A search range may be determined based on the (e.g., entire, substantially all, etc.) solid angle cover by the target viewport. Only source pixels that fall within this solid angle in the selected sampled images are used in warping operations to generate warped images of the target view from the selected sampled images. In some embodiments, angles to which the source pixels correspond can be determined directly based on the source pixels' positions in the selected panorama sample images. Textures (e.g., raster image data, pixel values, luma and chroma values, etc.) and depths of the source pixels need to be decoded only if it is determined that the source pixels contribute to the target viewpoint. In some embodiments, a projection mapping that preserves uniformity in sampling on a spherical imaging surface may be used to facilitate computation/determination of angles (e.g., directly, etc.) based on pixel positions. In some embodiments, a projection mapping that does not preserve uniformity in sampling on a spherical imaging surface may be used; conversion mappings may be used to determine angles (e.g., indirectly, etc.) based on pixel positions. Additionally, optionally or alternatively, angle computations/determinations on a rectangular map can be used as a substitute for angle computations/determinations on a spherical imaging surface, based on one or more projection mappings such as unicube, isocube, healpix, equi-solid angle projection, etc.

7. Compressing Image and Depth Data in Selected Views

Multiview images in a WFOV parameterized representation as described herein comprise luma and chroma values directly depicting visual objects in 3D scenes. As compared with light field functions that comprise values depicting light rays of a light field that indirectly depicting the visual objects in the 3D scenes, the multiview images in the WFOV parameterized representation comprises raster image data and depth data that are amenable for efficient compression by video codecs. In some embodiments, the video codecs can perform efficient compression on the raster image data and depth data in the multiview images based on a hybrid coding structure that applies prediction operations followed by transform coding (e.g., MDCT, MDST, DFT, DCT, QMF, etc.) of residuals. Additionally, optionally or alternatively, the video codecs (e.g., 3D-HEVC, etc.) can implement enhancements/modifications to functionality (e.g., 3D-HEVC, etc.) that performs depth-related compression operations, that supports 3D sampling of viewpoints, etc.

Encoding each sampled view independent of other sampled view would enable randomly accessing any sampled view but would not exploit correlation between views, hence resulting in low compression efficiency. On the other hand, using already coded views to predict the current view to be coded would increase the compression efficiency at the expense of random access, which would necessitate decoding all the required reference views just to reconstruct a single view. Techniques as described herein can be used to enable random access to sampled views in the plurality of sampled views of the multiview image and to target views through the sampled views while maintaining relatively high coding efficiency. To support random access to sampled views, a prediction structure may be used by the upstream device. The prediction structure may use a combination of one or more (e.g., pixel-based, block-based, a macroblock-based, a sub-macroblock-based, frame-based, view-based, etc.) prediction methods operating in a variety of prediction modes.

In some embodiments, a plurality of prediction modes (e.g., candidate prediction modes, etc.) may be available for encoding or decoding a block in a texture image, a depth image, etc., for a (e.g., current, etc.) sampled view.

By way of example but not limitation, the plurality of prediction modes may include an "INTRA" prediction mode in which image data of a block can be predicted (or compressed) based on spatial prediction (or one or more spatial prediction methods) from neighboring (e.g., timewise concurrent, etc.) blocks in a (e.g., spatial, causal, etc.) neighborhood within the same texture image of the same sampled view.

In some embodiments, the plurality of prediction modes includes an "INTER" prediction mode in which the image data of the block can be predicted (or compressed) based on motion compensated prediction (or one or more motion compensated prediction methods) from already reconstructed/decoded pictures (or reference pictures) corresponding to different time instants (or different time points) of the same sampled view.

In some embodiments, the plurality of prediction modes includes an "INTER_VIEW" prediction mode in which the image data of the block can be predicted (or compressed) based on disparity compensated prediction (or one or more disparity compensated prediction methods) from already reconstructed/decoded pictures (or reference pictures) of other sampled views corresponding to the same time instant (or the same time point) as the current sampled view.

In some embodiments, one or more sampled views are designated as key views. Temporal prediction may be allowed only for these views. All the remaining views may not use temporal prediction, but may refer to the key views for "INTER_VIEW" prediction. The key views may be decoded at every time instant, but the other (non-key) views are decoded only when needed for synthesizing a target view that does not coincide or included with sampled views in multiview images.

More specifically, on the encoder side, a prediction structure can be created for one or more multiview images each of which comprises multiview image data for a plurality of sampled views. The prediction structure designates one or more sampled views in the plurality of sampled views as one or more key views, and all remaining sampled views in the plurality of sampled views as dependent views. A predicted multiview image data portion is generated for a key view in the prediction structure based INTRA prediction (based on spatial prediction referring to reconstructed samples of the same key view and the same time instant), or INTER prediction (based on motion compensated temporal prediction referring to one or more previously reconstructed reference pictures of the same key view but different time instant), or INTER_VIEW prediction (based on disparity compensated prediction referring to one or more reconstructed pictures of other key views but same time instant). A predicted multiview image data portion is generated for a dependent view in the prediction structure based on spatial INTRA prediction (based on spatial prediction referring to one or more reconstructed samples of the same dependent view and the same time instant), or INTER_VIEW prediction (based on disparity compensated prediction referring to one or more reconstructed pictures of key views and the same time instant). INTER prediction is not used for dependent views. Also, a dependent view is not used as a reference for INTER_VIEW prediction. The residual multiview image data portion for the one or more key views and a residual multiview image data portion for the dependent view are encoded into a multiview video signal to be transmitted to a downstream device. The residual multiview image data portion is generated based on the predicted multiview image data portion and the original multiview image data portion.

On the decoder side, a multiview video signal is decoded into one or more multiview image data portions of one or more residual multiview images for one or more key views in a prediction structure and a residual multiview image data portion for a dependent view in the prediction structure. The residual multiview image data portion has been generated based on a predicted multiview image data portion and an original multiview image data portion of the one or more multiview images. The one or more key views and the dependent view belong to a plurality of sampled views of one or more multiview images. The predicted multiview image data portion for the dependent view is generated based on the one or more multiview image data portions of the one or more multiview images for the one or more key views. The multiview image data portion of the one or more multiview images is generated based on the predicted multiview image data portion and the residual multiview image data portion. One or more display images derived at least in part from the multiview image data portion of the one or more multiview images for the dependent view are caused to be rendered on a display.

Example prediction structure for sampled views in multiview images can be found in the previously mentioned U.S. Provisional Patent Application No. 62/518,187.

In some embodiments, a base model (e.g., an arbitrary base model, a specific base model, etc.) common to sampled views in a multiview image may be generated and used to predict image data and depth data of the sampled views. Residuals between the predicted image data and actual raster image data and between the predicted depth data and actual depth data may be encoded for each sampled view in the multiview image. Example base models as described herein may include, but are not necessarily limited to only, any of: 3D models, point-clouds based models, octree-data based models, omnidirectional-stereo-panoramas based models, tapestry-encoding based models, etc.

For example, in some embodiments, one or more of omnidirectional stereo panorama, tapestry, etc., may be used in place of, or in addition to, a 3D model to generate relatively low-quality (e.g., rough, etc.) predicted image/depth data, supplemented by residual image/depth data that can be used with the predicted image/depth data to generate relatively high-quality (e.g., fine, etc.) image/depth data.

Example omnidirectional stereo panoramas can be found in S. Peleg, M. Ben-Ezra, and Y. Pritch, "*OmniStereo: Panoramic Stereo Imaging*," IEEE Trans. on PAMI, March 2001, pp. 279-290. Example tapestry encoding can be found in U.S. Pat. No. 9,451,232, the entire contents of which are hereby incorporated by reference as if fully set forth herein.

The base model can be projected into a predicted panorama (e.g., a predicted panoramic image, a predicted panoramic depth map, etc.) in reference to a WFOV viewpoint (at a view position). The base model may be encoded in a media stream (e.g., a coded bitstream, etc.), and used by a recipient device of the media stream to generate the predicted panorama as a prediction for the original/actual panorama (e.g., an original/actual panoramic image, an original/actual panoramic depth map, etc.) in reference to the WFOV viewpoint (at the view position). Residuals between the predicted panorama and the original/actual panorama may be encoded into coded sampled views in the media stream (e.g., a sub-stream, etc.) along with the base model. Thus, the base model can be relatively efficiently compressed and represented in the media stream (or the coded bitstream), while the coded sampled views comprising the residuals can be maintained as (residual) image/depth data. These (residual) image/depth data can be combined with the predicted panorama to generate relatively high quality image/depth data.

It is observed that, in many instances, rendering human faces, skin, etc. based purely on model-based representations generates images that lack rich image details to which a viewer might be used to in the real world. Hence, such images (based purely on model-based representations) could lead to so-called "uncanny valley" effect, where perceived realism of the images could drop even when more network and processing resources are spent. In contrast, under techniques as described herein, the base model is used for prediction. The rich image details can be represented and preserved as part of the residual image/depth data in the media stream for each viewpoint represented in a multiview image, so long as the original/actual image/depth used to generate the residual image/depth data contains those rich image details. Additionally, optionally or alternatively, the number of bits allocated for encoding the base model can be traded off against the number of bits allocated for encoding the residual image/depth data, on an image-to-image basis, on a scene-to-scene basis, etc.

8. Capturing/Producing Multiview Images

Representing multiview images in the WFOV parameterized representation brings about a significant advantage of elegantly separating how multiview content is captured or produced (e.g., how cameras are distributed in a physical rig, how virtual cameras are distributed in a virtual rig, etc.) and how the multiview content is rendered. As used herein, multiview content may refer both computer-generated (CG) multiview content and multiview content captured from real-world scenes.

In case of capturing/producing CG multiview content, 3D models and associated data can be used to render panoramic textures and depth maps from viewpoints with view positions distributed throughout a viewing volume. This may be computationally intensive if using relatively complex ray tracing algorithms to produce photorealistic renderings.

However as previously noted, rendering with multiview images as described herein on the decoder/client side (e.g., final display image rendering by a recipient device, etc.) can be image based by combining residual image/depth data with predicted image/depth data, while the 3D models can be provided to the decoder/client side and used by the decoder/client side to generate the predicted image/depth data. Under techniques as described herein, there is no or little need to apply the relatively complex ray tracing algorithms to produce photorealistic renderings. Rather, relatively less complex algorithm to construct the predicted image/depth data can be used. Hence, even in case of capturing/generating CG multiview content, the techniques as described herein have advantages in terms of compression efficiency and client-side rendering complexity.

In case of capturing/producing multiview content from real-world scenes, a physical rig may be built with an array of cameras distributed such that the desired total field-of-view from a viewing volume is (e.g., completely, contiguously, etc.) covered while maintaining overlaps among neighboring fields of views across neighboring cameras in the physical rig. Each camera may be of a regular field of view (e.g., a 70-degree diagonal field of view, etc.), and may, but is not required to, be a wide field of view. Cameras in the physical rig may be initially calibrated to determine individual camera characteristics (e.g., intrinsic to the cameras, intrinsic to the physical rig, etc.), and camera poses (e.g., camera positions and camera directions, etc.) relative to a reference coordinate system such as a world coordinate system, a stationary coordinate system stationary to the physical rig, relative camera positions and/or relative camera directions between or among the cameras of the physical rig, and so forth. Same image features across cameras may be matched using 3D reconstruction/depth estimation techniques. The relative camera positions/directions of the cameras and pixel shifts of the matched image features among the cameras may be used to triangulate depths of world points of the matched image feature. Techniques as described herein can operate with any in a variety of 3D reconstruction/depth estimation techniques. Example 3D reconstruction/depth estimation technique may include, but are not necessarily limited to only, one or more of: active depth sensing using time-of-flight (e.g., LIDAR, etc.), structured light 3D scanning, etc.

These camera images (or textures) from the viewpoints at the camera's positions can be projected into a common world coordinate system using the estimated depth maps and merged into an overall point cloud or a set of local point clouds in the same coordinate space. Points in the overall point cloud or the set of local point clouds can be used to project to (or generate) a set of WFOV sampled images and a set of WFOV sampled depth maps for a set of sampled views with sampled view positions distributed throughout the viewing volume. Pixel values and depths of world points depicted in these WFOV sampled images and WFOV sampled depth maps may be recorded or indexed on panoramic imaging surfaces such as cubic imaging surfaces, a spherical imaging surface, and so forth. In some embodiments, these WFOV sampled images and WFOV depth maps may be provided as a part of a time sequence of raw multiview images to a post-production system to add view dependent effects, to implement specific artistic intent, generate a final/releasable version of a time sequence of post-processed multiview images (or simply multiview images) in the WFOV parameterized representation. The time sequence of multiview images can be used to support video encoding (e.g., in a VR or AR application, etc.), which may be dependent on target views (e.g., of an end-user wearable device, etc.) that vary over time.

Figure 3B:
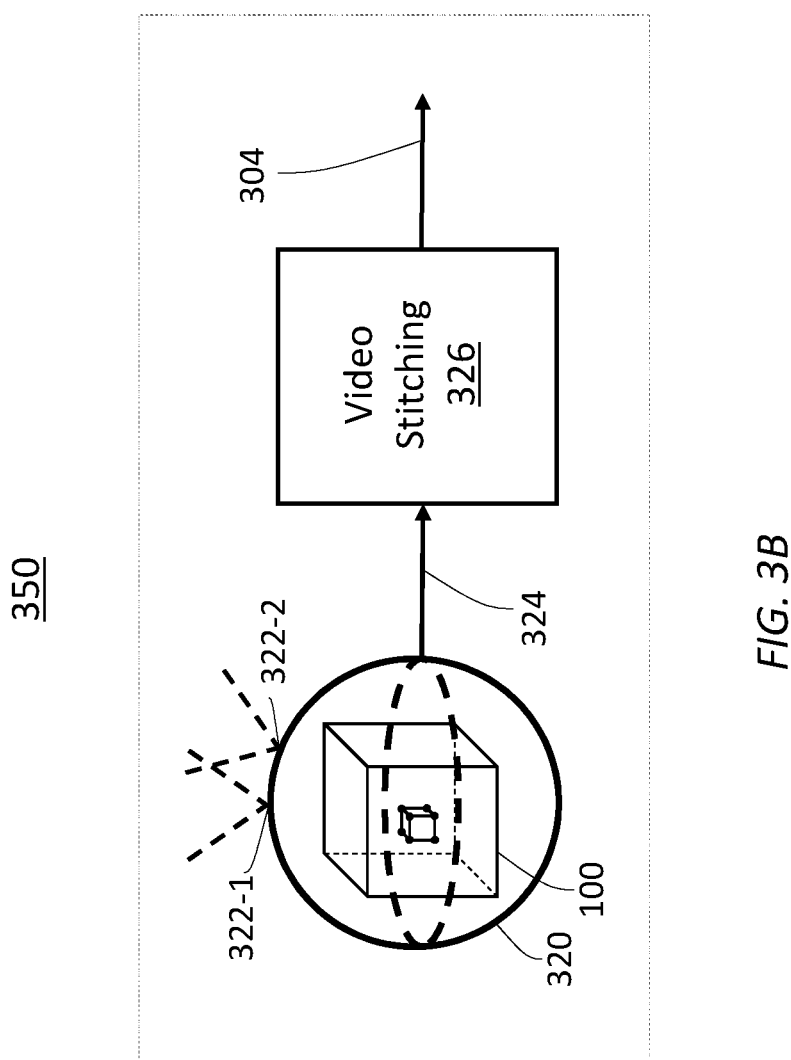
FIG. 3B illustrates an example multiview image creation system.

FIG. 3B illustrates an example multiview image creation system 350. In some embodiments, image data such as raw high dynamic range images, scene-referred images, etc., is captured by one or more camera systems deployed in a 3D scene. Additionally, optionally, or alternatively, image data as described herein comprises computer-generated imagery information for a (real or artificial) 3D scene. A 3D scene as described herein may be, without limitation, any of: physical 3D scenes, simulated 3D scenes, overlaid, composited or superimposed 3D scenes, movie studios, outdoor scenes, indoor scenes, tunnels, streets, vehicles, ships, aircrafts, outer space, etc.

In some embodiments, the multiview image creation system (350) comprises a camera system 320 deployed in a spatial environment. In some embodiments, the camera system (320) may comprise, but is not necessarily limited to only, a plurality of cameras (e.g., 322-1, 322-2, etc.). Some or all of the cameras may, but are not limited to only, be high dynamic range cameras, directional cameras aiming at specific spatial directions, etc. The cameras may be configured with overlapping fields of view, for example, across all angles (360 degrees) of a plane, a cube, a sphere, a cylinder, a tetrahedron, etc. Additionally, optionally, or alternatively, at least some of the cameras in the camera system (320) may be configured to face up (toward a viewer of FIG. 3B) and down (away from a viewer of FIG. 3B), respectively, relative to the plane represented by FIG. 3B. Some or all of the cameras may have relatively wide-angle coverage, relatively narrow-angle coverage, etc. An individual camera among the cameras may or may not cover a wide field of view. Any two cameras among the cameras may or may not cover the same field of view.

In some embodiments, at least two neighboring cameras among the cameras have partly overlapping fields of views. In some embodiments, the overlapping fields of views of the cameras (e.g., 322-1, 322-2, etc.) cover all solid angles (e.g., a Cartesian coordinate system of 360 degrees times 180 degrees, $4\pi$ steradians of a whole enclosing surface, etc.) in the 3D scene in which the camera system (320) is physically present.

The cameras in the camera system (320) can be controlled to generate individual video streams 324 over time. The individual video streams (324) may represent one or more video streams that are simultaneous, contemporaneous, synchronized, near synchronized, asynchronous, time-stamped, time-correlated, etc. In some embodiments, the multiview image creation system (350) comprises software, hardware, a combination of software and hardware, etc., configured to receive the individual video streams (324) generated by the camera system (320); apply video stitching operations 326 to the individual video streams (324) to generate a panorama video stream comprising a sequence of (e.g., stitched, etc.) raw multiview images (e.g., 304 of FIG. 3A, etc.); etc.

More specifically, the individual video streams (324) may be used to generate (e.g., by interpolation, extrapolation, warping, blending, rotation, translation, etc.) a plurality of WFOV sampled images for a plurality of sampled views with a plurality of sampled view positions distributed throughout a viewing volume (e.g., 100, etc.).

It should be noted that, in various embodiments, a sampled view position in the plurality of sampled view positions may or may not coincide with any of the cameras (e.g., 322-1, 322-2, etc.) of the camera system (320).

It should also be noted that, in various embodiments, the viewing volume (100) may be enclosed within the geometry of a physical housing of the camera system (320), may be coextensive spatially with the geometry of the physical housing of the camera system (320), may be outside the geometry of the physical housing of the camera system (320), may be partially overlapped with the geometry of the physical housing of the camera system (320), etc. In some embodiments, parts of 360° scene may be captured in a time-sliced manner, e.g. a planar array of cameras capturing a video in a front direction, followed by side directions, etc., and then stitched/composited together as though all the directions were captured at once.

In some embodiments, each of the WFOV sampled images and the WFOV sampled depth maps in the multiview images covers a wide field of view; the wide field of view simultaneously cover two fields of views of both eyes of a viewer. In some embodiments, the total number of sampled positions covered by a multiview image as described herein are no fewer than three (3).

In some embodiments, the plurality of sampled view positions comprises at least four sampled points in the viewing volume (100) that are not coplanar. In an example, the plurality of sampled view positions may comprise four or more interior sampled points within the viewing volume (100) that are not coplanar, e.g. the four points form a tetrahedron. In another example, the plurality of sampled view positions may comprise four or more sampled points in the viewing volume (100) that are not coplanar; at least one of the four or more sampled points is interior within the viewing volume (100).

Additionally, optionally or alternatively, for each sampled view, instead of storing all image details of the sampled view in a single monolithic unlayered image (or image layer), the image details of the sampled view such as diffuse image details, specular image details, etc., may be stored in multiple image layers. Each image layer of the multiple image layers may comprise its own texture image(s), depth image(s), etc. For example, the diffuse image details of the sampled view may be stored in a diffuse image layer that comprises a diffuse WFOV sampled image and a diffuse WFOV sampled depth map. The specular image details of the sampled view may be stored in a specular image layer that comprises a specular WFOV sampled image and a specular WFOV sampled depth map.

A layered scheme as described herein supports reconstructing and rendering diffuse images in the diffuse image layer by a legacy video decoder that may be of a limited dynamic range or limited processing capabilities, as well as reconstructing and rendering target images that contain both specular and diffuse image details from the diffuse and specular WFOV sampled images in the different image layers by a compliant video decoder that may be of a relatively large dynamic range or relatively expansive processing capabilities.

In each image layer (e.g., the diffuse image layer, the specular image layer, etc.), WFOV sampled images of a set of neighboring sampled views relative to a target view can be used to generate a set of warped images of the target view using WFOV sampled depth maps of the set of neighboring sampled views; the WFOV sampled depth maps of the set of neighboring sampled views correspond to the WFOV sampled images of the set of neighboring sampled views.

The set of warped images of the same target view in an image layer can be blended into a blended warped image of the target view for the image layer. A denser set of neighboring sampled views may be used in an image layer (e.g., the specular image layer, etc.) that is used to capture relatively more view-dependent (e.g., fleeting, etc.) effects. A less denser set of neighboring sampled views may be used in an image layer (e.g., the diffuse image layer, etc.) that is used to capture relatively less view-dependent (e.g., stable, etc.) effects such as diffuse image details.

Furthermore, multiple blended warped images of the target view for the multiple image layers can be composited into a final synthesized image of the same target view. The final synthesized image of the same target view can be used as, or can be used to derive, a display image to be rendered with a display of the wearable device to the viewer.

Example operations in relation to multi-layer multiview images can be found in the previously mentioned U.S. Provisional Patent Application No. 62/518,187.

9. Example Process Flows

FIG. 4A illustrates an example process flow according to an example embodiment of the present invention. In some example embodiments, one or more computing devices or components may perform this process flow. In block 402, an image processing device determines a target view to a 3D scene depicted by a multiview image. The image processing device may be an upstream device comprising one or more of: an image capturing device (e.g., 302 of FIG. 3A, etc.), a post-camera ISP (e.g., 306 of FIG. 3A, etc.), a video encoder (e.g., 308 of FIG. 3A, etc.), etc. The multiview image comprises a plurality of sampled views at a plurality of sampled view positions distributed throughout a viewing volume. Each sampled view in the plurality of sampled views of the multiview image comprises a wide-field-of-view (WFOV) image and a WFOV depth map corresponding to the WFOV image. Each sampled view of the multi-view image in the plurality of sampled views of the multiview image corresponds to a respective sampled view position in the plurality of sampled view positions.

In block 404, the image processing device uses the target view to select, from the plurality of sampled views of the multiview image, a set of sampled views. Each sampled view in the plurality of sampled views corresponds to a respective viewpoint to the 3D scene.

In block 406, the image processing device causes a display image to be rendered on a display of a wearable device of a user. The display image is generated based on one or more portions of the WFOV image and one or more portions of the WFOV depth map for each such sampled view in the set of sampled views.

In an embodiment, the multiview image is a part of a sequence of multiview images indexed by a sequence of time instants.

In an embodiment, the target view is determined based on a spatial position and a spatial direction of a wearable device operating in conjunction with the downstream device.

In an embodiment, the target view has a view position that does not coincide with a sampled view position of any sampled view in the plurality of sampled views.

In an embodiment, the set of sampled views represents a proper subset of the plurality of sampled views of the multiview image.

In an embodiment, the set of sampled views comprises neighboring sampled views, relative to the target view, that are selected from the plurality of sampled views based on linear distances of view positions of the neighboring sampled views to a view position of the target view.

In an embodiment, the viewing volume represents one of: a cubic volume, a spherical volume, a cylindrical volume, a tetrahedral volume, a non-cubic-non-spherical bounded volume, etc.

In an embodiment, at least some of the plurality of sampled view positions are distributed in the viewing volume's interior regions.

In an embodiment, at least some of the plurality of sampled view positions are distributed on an outer surface enclosing the viewing volume.

In an embodiment, each of the WFOV image and the WFOV depth map covers a field of view that is no less than a hemisphere.

In an embodiment, each of the WFOV image and the WFOV depth map comprises image or depth data indexed on a spherical surface that is no less than a hemispheric surface.

In an embodiment, each of the WFOV image and the WFOV depth map comprises image or depth data indexed on one or more non-spherical surfaces that cover a solid angle no less than a solid angle of a hemispheric surface.

In an embodiment, an overall solid angle cover by each of the WFOV image and the WFOV depth map is greater than a solid angle of a hemispheric surface; one or more solid angle portions covered by the one or more portions of the WFOV image is no greater than a solid angle of the hemispheric surface.

In an embodiment, an overall solid angle cover by each of the WFOV image and the WFOV depth map is greater than a solid angle of a hemispheric surface; the one or more portions of the WFOV image covers a solid angle between a solid angle of the hemispheric surface and a solid angle of a viewport of the display of the wearable device.

In an embodiment, the image processing device is further configured to perform: encoding the one or more portions of the WFOV image and the one or more portions of the WFOV depth map for each sampled view in the set of sampled views into a multiview video signal to be transmitted to a downstream device.

In an embodiment, at least one of the WFOV sampled image and the WFOV sampled depth map is encoded based at least in part on one or more of: one or more INTRA prediction methods, one or more INTER prediction methods, one or more INTER_VIEW prediction methods, etc.

In an embodiment, the multiview video signal is encoded with residual values derived as differences between (a) one or more portions of a predicted WFOV image and one or more portions of a predicted WFOV depth map and (b) the one or more portions of the WFOV image and the one or more portions of the WFOV depth map, for each sampled view in the set of sampled views; the multiview video signal is further encoded with 3D model data; the 3D model data specifies a 3D model based on which the one or more portions of the predicted WFOV image and the one or more portions of the predicted WFOV depth map for each sampled view in the set of sampled views are generated.

In an embodiment, the multiview video signal is encoded with residual values derived as differences between (a) one or more portions of a predicted WFOV image and one or more portions of a predicted WFOV depth map and (b) the one or more portions of the WFOV image and the one or more portions of the WFOV depth map, for at least one sampled view in the set of sampled views; the multiview video signal is further encoded with key view data; wherein the key view data specifies one or more portions of one or more key sampled images and one or more portions of one or more key sampled depth maps for one or more key sampled views of the multiview image; the key view data is used to generate the one or more portions of a predicted WFOV image and the one or more portions of a predicted WFOV depth map for the at least one sampled view in the set of sampled views.

In an embodiment, the plurality of sampled views of the multiview image comprises real-world multiview content that is generated based at least in part on applying point cloud techniques to real-world image and depth data acquired by an image and depth acquisition system that comprises a plurality of cameras located at different spatial positions.

In an embodiment, the plurality of sampled views of the multiview image comprises computer-generated (CG) multiview content that is generated based at least in part on 3D reconstruction and depth estimation techniques to a 3D model from the plurality of sampled positions.

FIG. 4B illustrates an example process flow according to an example embodiment of the present invention. In some example embodiments, one or more computing devices or components may perform this process flow. In block 422, an image processing device receives one or more portions of a wide-field-of-view (WFOV) image and one or more portions of a WFOV depth map for each sampled view in a set of sampled views of a multiview image. The image processing device may be a downstream device comprising one or more of: a video decoder (e.g., 310 of FIG. 3A, etc.), a display manager (e.g., 312 of FIG. 3A, etc.), etc. Each sampled view in the set of sampled views corresponds to a respective viewpoint in a set of viewpoints to a 3D scene.

In block 424, the image processing device warps the one or more portions of the WFOV image for each such sampled view in the set of sampled views to a set of warped images of a target view based on the one or more portions of the WFOV depth map for each such sampled view.

In block 426, the image processing device blends the set of warped images of the target view into a blended warped image of the target view.

In block 428, the image processing device causes a display image derived at least in part from the blended warped image of the target view to be rendered on a display of a wearable device.

In an embodiment, the method is performed by a downstream device that receives the multiview video signal from an upstream device; the target view is determined based on device tracking information indicating a spatial position and a spatial direction of the wearable device operating in conjunction with the downstream device.

In an embodiment, the set of sampled views is selected based on the target view from a plurality of sampled views of the multiview image.

In an embodiment, the image processing device is further configured to perform: decoding a multiview video signal into the one or more portions of the WFOV image and the one or more portions of the WFOV depth maps for the set of sampled views.

In an embodiment, at least one of t the one or more portions of the WFOV image and the one or more portions of the WFOV depth maps is decoded based at least in part on one or more of: one or more INTRA prediction methods, one or more INTER prediction methods, one or more INTER_VIEW prediction methods, etc.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for selecting sampled views of multiview images, comprising:
   determining a target view to a 3D scene depicted by a multiview image, the multiview image comprising a plurality of sampled views at a plurality of sampled view positions distributed throughout a viewing volume, each sampled view in the plurality of sampled views of the multiview image comprising a wide-field-of-view (WFOV) image and a WFOV depth map corresponding to the WFOV image, each sampled view of the multiview image in the plurality of sampled views of the multiview image corresponding to a respective sampled view position in the plurality of sampled view positions;
   using the target view to select, from the plurality of sampled views of the multiview image, a set of sampled views, each sampled view in the plurality of sampled views corresponding to a respective viewpoint to the 3D scene;
   causing a display image to be rendered on a display of a wearable device of a user, the display image being generated based on one or more portions of the WFOV image and one or more portions of the WFOV depth map for each such sampled view in the set of sampled views.

2. The method of claim 1, wherein the multiview image is a part of a sequence of multiview images indexed by a sequence of time instants.

3. The method of claim 1, wherein the target view is determined based on a spatial position and a spatial direction of a wearable device operating in conjunction with the downstream device.

4. The method of claim 1, wherein the target view has a view position that does not coincide with a sampled view position of any sampled view in the plurality of sampled views.

5. The method of claim 1, wherein the set of sampled views represents a proper subset of the plurality of sampled views of the multiview image.

6. The method of claim 1, wherein the set of sampled views comprises neighboring sampled views, relative to the target view, that are selected from the plurality of sampled views based on linear distances of view positions of the neighboring sampled views to a view position of the target view.

7. The method of claim 1, wherein the viewing volume represents one of: a cubic volume, a spherical volume, a cylindrical volume, a tetrahedral volume, or a non-cubic-non-spherical bounded volume.

8. The method of claim 1, wherein at least some of the plurality of sampled view positions are distributed in the viewing volume's interior regions.

9. The method of claim 1, wherein at least some of the plurality of sampled view positions are distributed on an outer surface enclosing the viewing volume.

10. The method of claim 1, wherein each of the WFOV image and the WFOV depth map covers a field of view that is no less than a hemisphere.

11. The method of claim 1, wherein each of the WFOV image and the WFOV depth map comprises image or depth data indexed on a spherical surface that is no less than a hemispheric surface.

12. The method of claim 1, wherein each of the WFOV image and the WFOV depth map comprises image or depth data indexed on one or more non-spherical surfaces that cover a solid angle no less than a solid angle of a hemispheric surface.

13. The method of claim 1, wherein an overall solid angle covered by each of the WFOV image and the WFOV depth map is greater than a solid angle of a hemispheric surface; and wherein one or more solid angle portions covered by the one or more portions of the WFOV image is no greater than a solid angle of the hemispheric surface.

14. The method of claim 1, wherein an overall solid angle covered by each of the WFOV image and the WFOV depth map is greater than a solid angle of a hemispheric surface; and wherein the one or more portions of the WFOV image covers a solid angle between a solid angle of the hemispheric surface and a solid angle of a viewport of the display of the wearable device.

15. The method of claim 1, where the plurality of sampled views of the multiview image comprises real-world multiview content that is generated based at least in part on applying 3D reconstruction and depth estimation techniques on real-world image data acquired by an image acquisition system that comprises a plurality of cameras located at different spatial positions.

16. A method for constructing display images from sampled views of multiview images, comprising:
receiving one or more portions of a wide-field-of-view (WFOV) image and one or more portions of a WFOV depth map for each sampled view in a set of sampled views of a multiview image, each sampled view in the set of sampled views corresponding to a respective viewpoint in a set of viewpoints to a 3D scene;
warping the one or more portions of the WFOV image for each such sampled view in the set of sampled views to a set of warped images of a target view based on the one or more portions of the WFOV depth map for each such sampled view;
blending the set of warped images of the target view into a blended warped image of the target view;
causing a display image derived at least in part from the blended warped image of the target view to be rendered on a display of a wearable device.

17. The method of claim 16, wherein the method is performed by a downstream device that receives the multiview video signal from an upstream device, and wherein the target view is determined based on device tracking information indicating a spatial position and a spatial direction of the wearable device operating in conjunction with the downstream device.

18. The method of claim 16, wherein the set of sampled views is selected based on the target view from a plurality of sampled views of the multiview image.

19. The method of claim 16, further comprising: decoding a multiview video signal into the one or more portions of the WFOV image and the one or more portions of the WFOV depth maps for the set of sampled views.

20. The method of claim 16, wherein at least one or more portions of the WFOV image and the one or more portions of the WFOV depth maps is decoded based at least in part on one or more of: one or more INTRA prediction methods, one or more INTER prediction methods, or one or more INTER_VIEW prediction methods.

* * * * *